US008996555B2

(12) United States Patent
Kuchmann-Beauger et al.

(10) Patent No.: US 8,996,555 B2
(45) Date of Patent: Mar. 31, 2015

(54) QUESTION ANSWERING FRAMEWORK FOR STRUCTURED QUERY LANGUAGES

(71) Applicant: SAP AG, Walldorf (DE)

(72) Inventors: Nicolas Kuchmann-Beauger, Paris (FR); Falk Brauer, Dresden (DE)

(73) Assignee: SAP SE, Walldorf, DE (US)

( * ) Notice: Subject to any disclaimer, the term of this patent is extended or adjusted under 35 U.S.C. 154(b) by 87 days.

(21) Appl. No.: 13/685,290

(22) Filed: Nov. 26, 2012

(65) Prior Publication Data

US 2014/0149446 A1 May 29, 2014

(51) Int. Cl.
*G06F 17/30* (2006.01)

(52) U.S. Cl.
CPC .... *G06F 17/30389* (2013.01); *G06F 17/30401* (2013.01); *G06F 17/30554* (2013.01); *G06F 17/30592* (2013.01)
USPC .......................................................... 707/763

(58) Field of Classification Search
CPC .............. G06F 17/2785; G06F 17/289; G06F 17/30569; G06F 17/30675; G06F 17/271; G06F 17/30696; G06F 17/3061; G06F 19/3437; G06F 19/345; G06F 17/2229; G06F 17/2247; G06F 17/30522; G06F 17/3053; G06F 17/30554; G06F 17/30616
USPC ......... 704/9, 4, 1, 10, 7, 270.1, 3, 8, E15.047, 704/E17.002, 200, 201, 248, 253, 256; 700/17, 83, 19, 20, 65, 86, 87, 1, 18, 700/33, 66, 79, 80, 94; 707/999.003, 707/999.005, E17.058, E17.078, 999.102, 707/999.2, E17.006, E17.084, 999.001, 707/E17.014, E17.108, 756, 758, 771, 707/999.006, 999.01, E17.005, E17.074, 707/706, 713, 723, 739, 748, 755, 769, 707/999.002, 999.004, 999.009, 999.101, 707/999.104, E17.002, E17.015, E17.017, 707/E17.045, E17.046, E17.054, E17.066, 707/E17.067, E17.068, E17.069, E17.089, 707/E17.109, E17.111, E17.116, E17.119, 707/715, 722, 728, 731, 732, 736, 737, 740, 707/741, 759, 760, 770, 776, 784, 811, 707/812; 705/2, 14.66, 14.14, 14.23, 14.27, 705/14.41, 14.46, 14.53, 14.71, 14.73, 1.1, 705/26.1, 28, 30, 305, 31, 32, 34, 35, 36 R, 705/37, 39, 400

See application file for complete search history.

(56) References Cited

U.S. PATENT DOCUMENTS 6,745,161 B1 * 6/2004 Arnold et al. ..................... 704/7
6,829,603 B1 * 12/2004 Chai et al. ............................. 1/1
(Continued)

OTHER PUBLICATIONS

M. A. Hearst, "'Natural' Search User Interfaces," Commun. ACM, vol. 54, No. 11, pp. 60-67, Nov. 2011.
(Continued)

*Primary Examiner* — Jay Morrison
*Assistant Examiner* — Ken Hoang
(74) *Attorney, Agent, or Firm* — Fountainhead Law Group PC

(57) ABSTRACT

A framework for a question and answering (Q&A) system defines a mapping of recognized semantics of user questions, to a well structured query model that can be executed on arbitrary data warehouses. Embodiments may utilize a plugin-based architecture, with various elements responsible for: extracting information from a user's question, formulating and executing a structured query, and post-processing a result by rendering a chart. Plugins within a certain processing step may be executed independently of one another, imparting a significant degree of parallelism. The framework may build on top of natural language processing technologies, and in particular embodiments may be based upon established standards (e.g. RDF and SparQL) thereby allowing adaptation to a variety of domains and use cases.

20 Claims, 21 Drawing Sheets

```
SELECT
  sum (Invoice_Line."DAYS"
    * Invoice_Line."NB_GUESTS"
    * Service."PRICE") AS revenue,
  Customer."LAST_NAME" AS customer
FROM City
INNER JOIN Customer
  ON (City."CITY_ID"=Customer."CITY_ID")
INNER JOIN Sales
  ON (Sales."CUST_ID"=Customer."CUST_ID")
INNER JOIN Invoice_Line
  ON (Invoice_Line."INV_ID"=Sales."INV_ID")
INNER JOIN Service
  ON (Invoice_Line."SERVICE_ID"=Service."SERVICE_ID")
WHERE
  city = 'Palo_Alto' AND
  age >= 20 AND
  age <= 30
GROUP BY
  customer
ORDER BY revenue
LIMIT 5
```

(56) References Cited

U.S. PATENT DOCUMENTS

| | | | |
|---|---|---|---|
| 7,483,891 B2* | 1/2009 | Liu et al. | 1/1 |
| 8,306,974 B2* | 11/2012 | Mungikar | 707/728 |
| 8,429,179 B1* | 4/2013 | Mirhaji | 707/756 |
| 2002/0059204 A1* | 5/2002 | Harris | 707/3 |
| 2006/0074980 A1* | 4/2006 | Sarkar | 707/104.1 |
| 2010/0070448 A1* | 3/2010 | Omoigui | 706/47 |
| 2012/0054185 A1* | 3/2012 | Johnson et al. | 707/739 |

OTHER PUBLICATIONS

H. He, H. Wang, J. Yang, and P. S. Yu, "Blinks: ranked keyword searches on graphs," in Proceedings of the 2007 ACM SIGMOD international conference on Management of Data, Ser. SIGMOD '07. New York, NY, USA: ACM, 2007, pp. 305-316.

S. Tata and G. M. Lohman, "Sqak: doing more with keywords," in Proceedings of the 2008 ACM SIGMOD international conference on Management of Data, Ser. SIGMOD '08. New York, NY, USA: ACM, 2008, pp. 889-902.

T. Tran, P. Cimiano, S. Rudolph, and R. Studer, "Ontology-based interpretation of keywords for semantic search," in Proceedings of the 6th international the semantic web and 2nd Asian conference on Asian semantic web conference, ser. ISWC'07/ASWC'07. Berlin, Heidelberg: Springer-Verlag, 2007, pp. 523-536.

A. Giacometti, P. Marcel, and E. Negre, "Recommending multidimensional queries," in Proceedings of the 11th International Conference on Data Warehousing and Knowledge Discovery, ser. DaWaK '09. Berlin, Heidelberg: Springer-Verlag, 2009, pp. 453-466.

M. Golfarelli and S. Rizzi, "A methodological framework for data warehouse design," in Proceedings of the 1st ACM international workshop on Data warehousing and OLAP, ser. DOLAP '98. New York, NY, USA: ACM, 1998, pp. 3-9.

R. Thollot, F. Brauer, W. M. Barczynski, and M.-A. Aufaure, "Text-to-query: dynamically building structured analytics to illustrate textual content," in Proceedings of the 2010 EDBT/ICDT Workshops, ser. EDBT '10. New York, NY, USA: ACM, 2010, pp. 14:1-14:8.

D. A. Hull, "Xerox trec-8 question answering track report," in Proceedings of the 8th Text REtrieval Conference (TREC-8), 1999.

F. Brauer, M. Huber, G. Hackenbroich, U. Leser, F. Naumann, and W. M. Barcynski, "Graph-based concept identification and disambiguation for enterprise search," in Proceedings of the 19th International Conference on World Wide Web, WWW 2010, Raleigh, North Carolina, USA, Apr. 26-30, 2010, pp. 171-180.

D. E. Appelt and B. Onyshkevych, "The common pattern specification language," in Proceedings of a workshop on held at Baltimore, Maryland: Oct. 13-15, 1998, ser. TIPSTER '98, 1998, pp. 23-30.

H. Cunningham, D. Maynard, V. Tablan, "Jape: a java annotation patterns engine," Research Memo for Institute for Language, speech and Hearing (ILASH) and Department of Computer Science, University of Sheffield, UK, Nov. 2000.

V. Levenshtein, "Binary Codes Capable of Correcting Deletions, Insertions and Reversals," Soviet Physics Doklady, vol. 10, p. 707, 1966.

A. Pal, F. M. Harper, and J. A. Konstan, "Exploring question selection bias to identify experts and potential experts in community question answering," ACM Trans. Inf. Syst., vol. 30, No. 2, pp. 10:1-10:28, May 2012.

T. C. Zhou, M. R. Lyu and I. King, "A classification-based approach to question routing in community question answering," in Proceedings of the 21st international conference companion on World Wide Web, ser. WWW '12 Companion. New York, NY, USA: ACM, 2012, pp. 783-790.

B. Li, I. King, and M. R. Lyu, "Question routing in community question answering: putting category in its place," in Proceedings of the 20th ACM international conference on Information and knowledge management, ser. CIKM '11. New York, NY, USA: ACM, 2011, pp. 2041-2044.

T. C. Zhou, X. Si, E. Y. Chang, I. King, and M. R. Lyu, "A data-driven approach to question subjectivity identification in community question answering," in AAAI, J. Hoffmann and B. Selman, Eds. AAAI Press, 2012.

B. Li, T. Jin, M. R. Lyu, I. King and B. Mak, "Analyzing and predicting question quality in community question answering services," in Proceedings of the 21st international conference companion on World Wide Web, ser. WWW '12 Companion. New York, NY, USA: ACM, 2012, pp. 775-782. [Online]. Available: http://doi.acm.org/10.1145/2187980.2188200.

M. Maybury, "New directions in question answering," in Advances in Open Domain Question Answering, ser. Text, Speech and Language Technology, T. Strzalkowski, S. Harabagiu, and N. Ide, Eds. Springer Netherlands, 2006, vol. 32, pp. 533-558.

E. Kandogan, R. Krishnamurthy, S. Raghvan, S. Vaithyanathan, and H. Zhu, "Avatar semantic search: a database approach to information retrieval," in Proceedings of the 2006 ACM SIGMOD international conference on Management of data, ser. SIGMOD '06. New York, NY, USA: ACM, 2006, pp. 790-792.

Q. Zhou, C. Wang, M. Xiong, H. Wang and Y. Yu, "Spark: adapting keyword query to semantic search," in Proceedings of the 6th international the semantic web and 2nd Asian conference on Asian semantic web conference, ser. ISWC'07/ASWC'07. Berlin, Heidelberg: Springer-Verlag, 2007, pp. 694-707.

S. Agrawal, S. Chaudhuri, G. Das, "Dbxplorer: A system for keyword-based search over relational databases," in Proceedings of the 18th International Conference on Data Engineering, ser. ICDE '02. Washington, DC, USA: IEEE Computer Society, 2002, pp. 5-. [Online]. Available: http://dl.acm.org/citation.cfm?id=876875.879013.

V. Hristidis, L. Gravano, and Y. Papakonstantinou, "Efficient ir-style keyword search over relational databases," in Proceedings of the 29th international conference on Very large data bases—vol. 29, ser. VLDB '03. VLDB Endowment, 2003, pp. 850-861. [Online]. Available: http://dl.acm.org/citation.cfm?id=1315451.1315524.

V. Hristidis and Y. Papakonstantinou, "Discover: keyword search in relational databases," in Proceedings of the 28th international conference on Very Large Data Bases, ser. VLDB '02. VLDB Endowment, 2002, pp. 670-681.

F. Liu, C. Yu, W. Meng, and A. Chowdhury, "Effective keyword search in relational databases," in Proceedings of the 2006 ACM SIGMOD international conference on Management of data, ser. SIGMOD '06. New York, NY, USA: ACM, 2006, pp. 563-574.

G. Orsi, L. Tanca, and E. Zimeo, "Keyword-based, context-aware selection of natural language query patterns," in Proceedings of the 14th International Conference on Extending Database Technology, ser. EDBT/ICDT '11. New York, NY, USA: ACM, 2011, pp. 189-200.

G. Li, X. Zhou, J. Feng, and J. Wang, "Progressive keyword search in relational databases," in Data Engineering, 2009. ICDE '09. IEEE 25th International Conference on, 29 2009-Apr. 2, 2009, pp. 1183-1186.

L. Blunschi, C. Jossen, D. Kossmann, M. Mori, and K. Stockinger, "Soda: Generating sql for business users," in Proceedings of the 38th International Conference on Very Large Databases, 2012.

\* cited by examiner

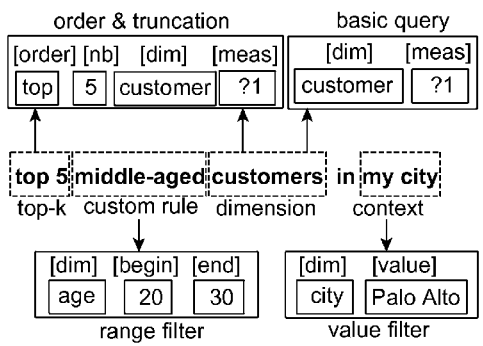

FIG. 1a

```
SELECT
  sum (Invoice_Line."DAYS"
    * Invoice_Line."NB_GUESTS"
    * Service."PRICE") AS revenue,
  Customer."LAST_NAME" AS customer
FROM City
INNER JOIN Customer
  ON (City."CITY_ID"=Customer."CITY_ID")
INNER JOIN Sales
  ON (Sales."CUST_ID"=Customer."CUST_ID")
INNER JOIN Invoice_Line
  ON (Invoice_Line."INV_ID"=Sales."INV_ID")
INNER JOIN Service
  ON (Invoice_Line."SERVICE_ID"=Service."SERVICE_ID")
WHERE
  city = 'Palo_Alto' AND
  age >= 20 AND
  age <= 30
GROUP BY
  customer
ORDER BY revenue
LIMIT 5
```

FIG. 1b

```
1   :yearsBackWardsToDateRange
2     rdf:type features:NlpPattern;
3     rdfs:label "Computes the beginning and end date, given a time range in years"^^xsd:string;
4     nlp:outputVariables "yearsBack,rangeBegin,rangeEnd"^^xsd:string;
5     nlp:rule
6       "(((<last>|..|<previous>)([OD yearsBack]<POS:Num>|[/OD]) ?<STEM:year>)"^^xsd:string;
7     nlp:computeVariablesWithScript
8       """
9       var today = new Date(); var dd = today.getDate(); var yyyy = today.getFullYear();
10      rangeEnd   = calculateEnd(dd,mm,yyyy);
11      rangeBegin = calculateStart(dd,mm,YYYY,yearsBack);
12      function calculateEnd(dd,mm,yyyy) {
13         return yyyy + '-' + mm + '-' + dd;
14      }
15      function calculateStart(dd,mm,yyyy,yearsBack) {
16         return (yyyy-yearsBack) + '-01-01';
17      }"""^^xsd:string ;
18    nlp:appliesTo dataType:Date;
```

FIG. 3a

```
WHERE {
?queryUri query-tree:hasAnnotation ?annotationUri_1 .
?annotationUri_1 query-tree:hasAnnotationType features:MeasureAnnotationType.
?annotationUri_1 query-tree:referencesResource ?measureUri_1 .
?measureUri_1 rdfs:label ?measureLabel_1 .

?queryUri query-tree:hasAnnotation ?annotationUri_2 .
?annotationUri_2 query-tree:hasAnnotationType features:DimensionAnnotationType.
?annotationUri_2 query-tree:referencesResource ?dimensionUri_1 .
?dimensionUri_1 rdfs:label ?dimensionLabel_1 .

?queryUri query-tree:hasAnnotation ?annotationUri_3 .
?annotationUri_3 query-tree:hasAnnotationType features:NlpFeatureAnnotationType.
?annotationUri_3 query-tree:generatedFromFeature features:yearsBackWardsToDateRange_Feature> .
?annotationUri_3 <urn:grepo/features/instances#rangeBegin> ?rangeBegin .
?annotationUri_3 <urn:grepo/features/instances#rangeEnd> ?rangeEnd .

features:yearsBackWardsToDateRange_Feature feature:referencesResource ?timeHierarchyItem.
?timeHierarchyItem slayer:hasDimension ?memberDimesionUri_1.
?memberUri_1 rdfs:label ?memberDimensionLabel.

?universeId rdfs:label ?universeName .
?measureUri_1 slayer:hasUniverse ?universeId .
?dimensionUri_1 slayer:hasUniverse ?universeId .
?memberDimesionUri_1 slayer:hasUniverse ?universeId .
}
```

FIG. 4ab

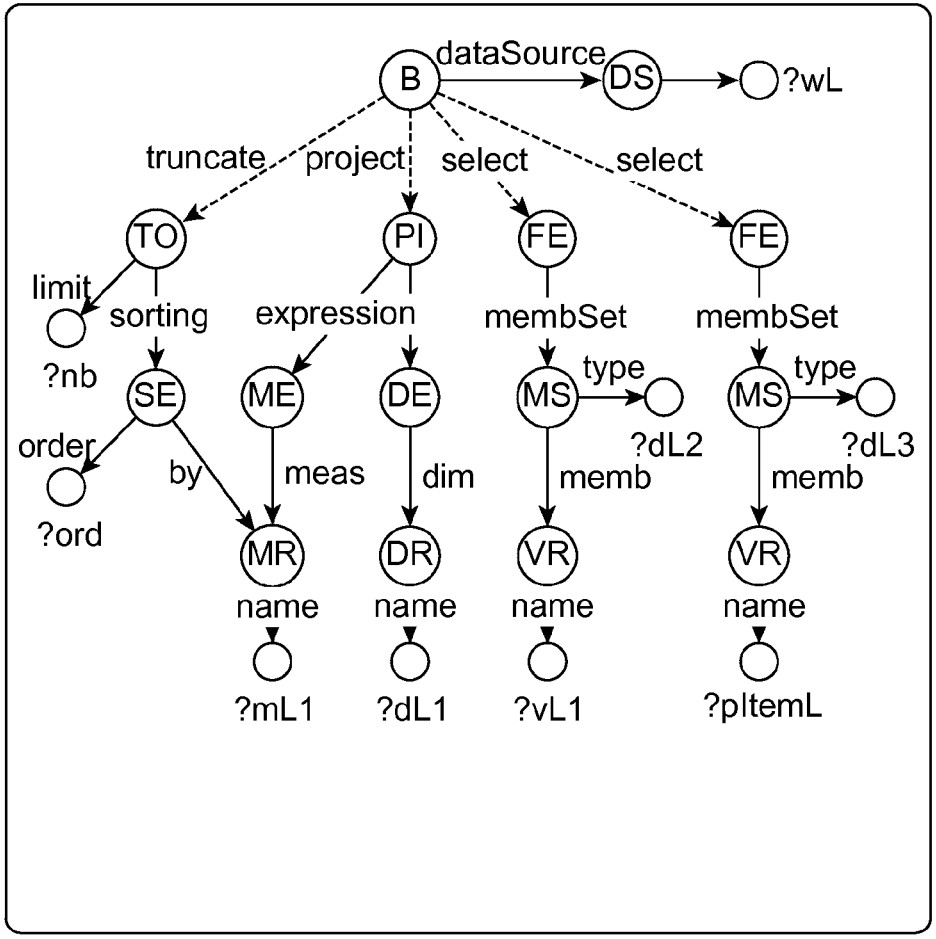

Type Abbreviations:
B - Structured Query
DS - Data Source
TO - Truncation & Order
SE - Sorting Expression
PI - Projection Items
ME - Measure Expression
MR - Measure Reference
DE - Dimension Expression
DR - Dimension Reference
FE - Filter Expression
MS - MemberSet
VR - Value Reference Variable Abbreviations:
?nb - number of items
?ord - order (DESC/ASC)
?dLx - dimension label #x
?vLx - member label #x
?mLx - measure label #x
?wL - warehouse label
?pItemL - profile label

FIG. 4ba

```
CONSTRUCT {
# define bquery and its structural properties
:bquery rdf:type <http://research.sap.corp/pattern/bquery> .
:bquery <http://research.sap.corp/pattern/bquery/hasProjectionItem> _:measureProjectionItem_1 .
:bquery <http://research.sap.corp/pattern/bquery/hasProjectionItem> _:dimensionProjectionItem_1 .
:bquery <http://research.sap.corp/pattern/bquery/hasFilterClause> _:filterClause_1 .
...

_:filterClause_1 rdf:type <http://research.sap.corp/pattern/memberFilter> .
_:filterClause_1 <http://research.sap.corp/pattern/memberFilter/hasMemberSet> _:memberSet .
_:memberSet rdf:type <http://research.sap.corp/pattern/memberFilter/memberRange> .
_:memberSet <http://research.sap.corp/pattern/typedMemberset/hasMemberClass> _:memberDimension .
_:memberSet <http://research.sap.corp/pattern/memberset/memberRange/from> _:member_1 .
_:memberSet <http://research.sap.corp/pattern/memberset/memberRange/to> _:member_2 .
_:member_1 rdf:type <http://research.sap.corp/pattern/member> .
_:member_1 <http://research.sap.corp/pattern/member/hasValue> ?rangeBegin .
_:member_2 rdf:type <http://research.sap.corp/pattern/member> .
_:member_2 <http://research.sap.corp/pattern/member/hasValue> ?rangeEnd .
}
```

FIG. 4bb

| Query | Updated query | Entities | Comment |
|---|---|---|---|
| State Population Change | | {State, Population change} | |
| Home Ownership by State | Owner-occupied dwellings by state | {State, Owner-occupied dwellings} | home ~ dwellings |
| USA States information | | {State} | |
| Generation Y in 2010 (Ages 10-32) | population by year for ages 10-32 | {Year, Population} | generation ~ demographic info. |
| And the whitest name in America is | names white percent | {Name, White percent} | whitest ~ white |
| 40+ Population Projections by Age | | {Age, Population projection} | |
| Average Time Spent Commuting by State | | {State, Median travel time to work} | |
| Percent Hispanic by State | | {State, Hispanic population} | |
| Population by ethnicity | population by race | {State, White race count, Other race count, American indian Eskimo and Aleut race count, Asian and pacific islander race count, Black, race count} | ethnicity ~ race* |
| Change in city & town populations | | {Town name, Population change} | |
| Population | | {State, County, Town name, Population} | |
| Domestic Net Migration | | {State, Domestic net migration} | |
| Population (by County) | | {County, population} | |
| US surnames | US names | | surnames ~ names |
| Age distribution by US population | | {Age, Male number, Female number} | |
| Where are rich people? | house hold income per state | {State, Average house hold income, Median house hold income} | riche ~ household income |
| People covered and not covered by Health Insurance by State | | {State, Covered} Not covered} | |

FIG. 10

| | | |
|---|---|---|
| Southeast Asian American Population by US County | | {County, Asian and Pacific islander race count} |
| Black vs. white college experience percentage by state | | {State, Percent white males with atleast some college, Percent black males with at least some college} |
| Dirtiest states from coal pollution | Plant name and carbon dioxide emissions | {State, Carbon dioxide emissions} dirtiest ~ emissions |
| 50MW+ Power Plants | Plant name with nameplate capacity > 500MW | {Plant name, Name plate capacity} 500MW+ ~ nameplate capacity |
| Emissions Per State Per Capita | | {State, Methane emissions, Nitrogen oxide emissions, Mercury emissions} |
| US Violent Crime | | {Crimerate} |
| Deaths per Year in the United States | | {Cause, Per year} |
| Home Valuation of Major Cities in US | | {City, Min valuation, Max valuation} |
| of Americans without health insurance | Americans not covered per state | {State, Without health insurance} health insurance ~ covered |
| Percent of men in Mass., 15 and over, never married | | {Percent men} |
| Marriages in the United States per 1,000 women by state | | {State, Marriage rage per 1,000 women} |
| Percentage of population aged 85+, by county | | {County, Percent population aged 85+} |
| Population by Age | Estimate by age | {Age, Population estimate} population ~ numeric estimate |
| Civilians Employed by Occupation | Amount by category | {Occupation category} occupation ~ category |
| Percent of Population 18+ (by state) | | {State, Percent population of age 18+} |
| Population categorized by ages and areas | Population categorized by ages and states | {Age, Population} areas ~ states |

Table 1: Examples of queries which are part of the evaluation corpus. In the comment column, '~' indicates how linguistic resources could improve the coverage of the current system.

FIG. 10 (Cont.)

QUESTION ANSWERING FRAMEWORK FOR STRUCTURED QUERY LANGUAGES

BACKGROUND

Embodiments of the present invention relate to methods and systems for accessing data stored in data warehouses, and in particular to question answering frameworks for structured query languages.

Unless otherwise indicated herein, the approaches described in this section are not prior art to the claims in this application and are not admitted to be prior art by inclusion in this section.

Recently, data warehouses have become information sources of information for decision making and controlling. Progress has been made to support non-technical end-users, by allowing interactive navigation inside complex reports or dashboards. Examples include interactive filtering, or calling Online Analytical Processing (OLAP) operations such as drill-down in a user-friendly way. In addition, effort has been made to make reports or dashboards searchable.

Currently, however, most non-technical users continue to rely upon pre-canned reports provided by a company's IT-department. This is because conventional Business Intelligence (BI) self-service tools still require significant technical insight on the part of the user (e.g. an understanding of the schema of the data warehouse).

Such ongoing reliance upon outside technical knowledge may be cumbersome, particularly because data warehouses have grown dramatically in size and complexity. For example one exemplary use case for BI, is the segmentation of customers to plan marketing campaigns (e.g. to derive the most valuable, middle-aged customers in a certain region).

In this context, it is not unusual for the business users planning such a campaign, to have to cope with hundreds of key performance indicators (KPIs) and attributes. The business users are required to combine this information in an ad-hoc manner in order to cluster their customer base.

A keyword or even natural language-based interface that allows users to formulate their information needs, would ease this task. This is because users are in general more comfortable using unstructured query interfaces, rather than highly structured ones.

Accordingly, the present disclosure addresses these and other issues with data warehouses, and in particular to question answering frameworks for structured query languages.

SUMMARY

A framework for a question and answering (Q&A) system defines a mapping of recognized semantics of user questions, to a well structured query model that can be executed on arbitrary data warehouses. Embodiments may utilize a plugin-based architecture, with various elements responsible for: extracting information from a user's question, formulating and executing a structured query, and post-processing a result by rendering a chart. Plugins within a certain processing step may be executed independently of one another, imparting a significant degree of parallelism. The framework may build on top of natural language processing technologies, and in particular embodiments may be based upon established standards (e.g. RDF and SparQL), thereby allowing adaptation to a variety of domains and use cases.

An embodiment of a computer-implemented method comprises causing an answering system to receive a user query posed in a natural language to a database, and causing the answering system to derive semantics from the user query and create a parse graph. Normalization and transformation of the semantics is performed. Constraints are imposed on the semantics to create structured artifacts. The artifacts are mapped into a structured query, and the structured query is executed on the database.

An embodiment of a non-transitory computer readable storage medium embodies a computer program for performing a method comprising causing an answering system to receive a user query posed in a natural language to a database, and causing the answering system to derive semantics from the user query and create a parse graph. Normalization and transformation of the semantics is performed. Constraints are imposed on the semantics to create structured artifacts. The artifacts are mapped into a structured query, and the structured query is executed on the database.

An embodiment of a computer system comprises one or more processors and a software program executable on said computer system. The software program is configured to cause an answering system to receive a user query posed in a natural language to a database, and to cause the answering system to derive semantics from the user query and create a parse graph. Normalization and transformation of the semantics are performed. Constraints are imposed on the semantics to create structured artifacts. The artifacts are mapped into a structured query, and the structured query is executed on the database.

According to certain embodiments the answering system comprises an information extraction plugin configured to derive the semantics from the user query.

In particular embodiments the answering system comprises a search plugin configured to recognize certain semantics from the parse graph, and to create the structured query from the certain semantics.

In some embodiments the parse graph is captured in Resource Description Framework (RDF) form by the search plugin, and the structured query is created in the SparQL query language.

According to various embodiments wherein the search plugin is written in Java.

In some embodiments the answering system further comprises a post-processing plugin configured to render a chart for an executed query result.

In particular embodiments the structured query comprises a data source, a set of dimensions and measures, and a set of filters.

The following detailed description and accompanying drawings provide a better understanding of the nature and advantages of particular embodiments.

BRIEF DESCRIPTION OF THE DRAWINGS

FIG. 1 shows an example question; FIG. 1b shows an example SQL-query that was generated from the user question in FIG. 1a.

FIG. 3a shows a listing of a pattern to compute dates from phrases.

FIG. 10 presents some gold standard queries that are used to evaluate similar IR systems.

DETAILED DESCRIPTION

Described herein are techniques for performing question answering for structured query languages. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Keyword based approaches may lack certain features allowing a question-driven data exploration by end-users. Examples of such questions can include but are not limited to consideration of range queries, the support to include application-specific vocabulary (e.g., "middle-aged"), and leveraging of the users' context (e.g., "customers in my region").

One challenge is to extract semantics from a user's question (e.g., from a range phrase such as "between 1999 and 2012"). Another challenge is to relate findings detected in a user's question to formulate a well-defined structured query.

Embodiments reduce the problem of interpreting natural language queries, to a constraint-solving problem. In general, the problem of Question Answering (Q&A) from structured data, can be formalized as follows. Given a structured query language L and a user's question $q_u$, a mapping $q_u \rightarrow R$ to a ranked list R (results) of structured queries $r_1, r_2, \ldots, r_n \in L$ is defined, where $r_i$ represents the i-th highest scored interpretation of the user's questions with respect to the data and metadata of the underlying structured data source.

A focus here is on multi-dimensional queries (as structured queries) and data warehouses (as data source), without restricting the generality of the approach. A simple multidimensional query may be represented by a number of dimensions (which are organized in hierarchies) or their attributes, measures (aggregated KPIs with respect to the used dimensions or attributes) and filters. A simple multidimensional query may be executed on top of a physical or virtual data cube (e.g., via an abstraction layer generating a mapping to SQL). In addition result modifiers (e.g. for sorting and truncation) can be added to a query.

Figure 2:
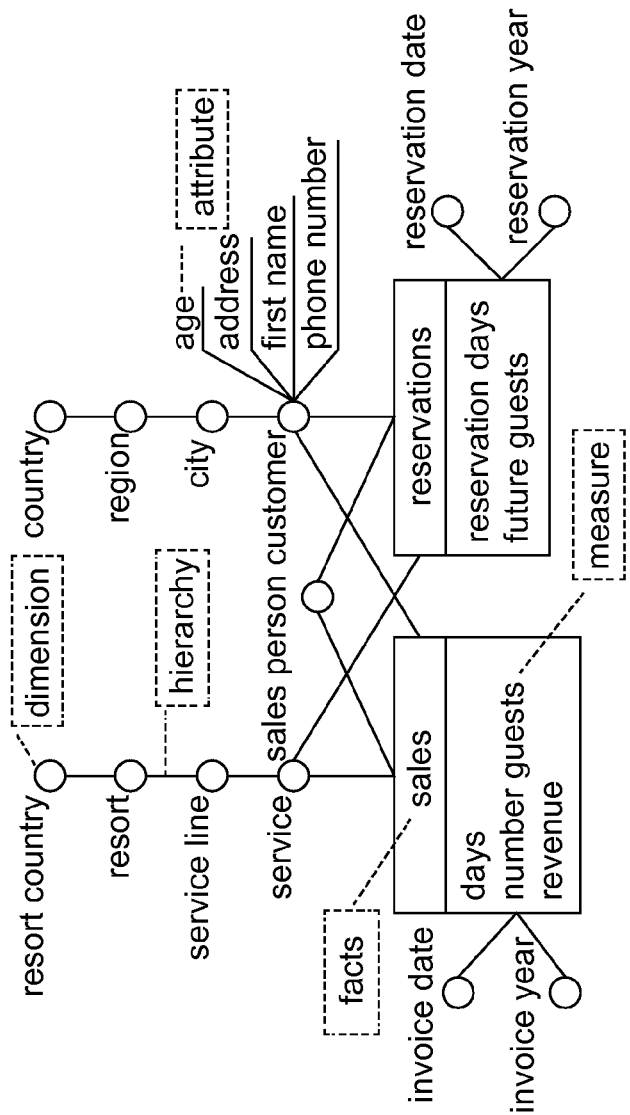
FIG. 2 is a logical data model of an example data mart

A logical schema of an example data mart (part of a data warehouse) is shown in FIG. 2. In particular, FIG. 2 is a logical data model of an example data mart (which maps to a physical galaxy schema.

Two fact tables (reservation, sales) define different measures (e.g., revenue or reservation days). These facts connect the different dimensions (e.g. customer and sales person).

Dimensions are organized in hierarchies (e.g., customer, city, region and country) and may have assigned a set of attributes (e.g., age for customer). Multi-dimensional queries may be posed in a proprietary query language and are translated via an abstraction layer into SQL queries (which may contain sub-queries).

Figure 1C:
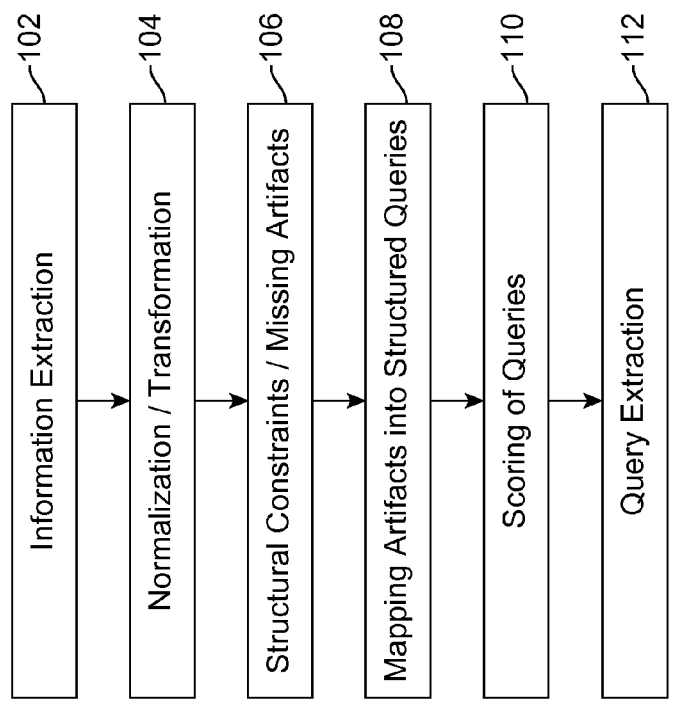
FIG. 1c shows a simplified process flow according to an embodiment.

An example question ($q_u$='Top 5 middle-aged customers in my city') is shown in FIG. 1a. Depicted in FIG. 1a are intermediate steps to derive the final structured query. Successive tokens that satisfy some constraints (e.g., 'customers', which matches the name of an entity in the data warehouse metadata) are marked with dotted lined boxes. Inferred semantics (e.g., the filter for the age range) are drawn with solid lined rectangles.

FIG. 1a shows a user's question and derived semantic units (comparable to a parse tree in natural language processing). Successive tokens that satisfy some constraints (e.g., linguistics pattern or dictionary matches) are marked with dotted lined boxes. Inferred semantics are drawn with solid lined rectangles. These semantic units of recognized entities form parts of potential structured queries that might fulfill the user's information need. In addition, the system proposes a measure for '?1' (e.g., 'revenue') to compute a valid multi-dimensional query.

The listing of FIG. 1b, depicts an example result query r∈R in SQL-syntax. In particular, FIG. 1b shows an example SQL-query that was generated from the user question in FIG. 1a. Natural language patterns, constraints given by the data and metadata of the data warehouse (see FIG. 2) have been applied to infer query semantics. This was mapped to a logical, multi-dimensional query, which in turn was translated to SQL.

The 'revenue' represents a proposed measure, depicted as '?1' in FIG. 1a. The computation of the measure 'revenue' and the join paths are configured in the metadata of the warehouse. Specifically, the join paths in the example—the aggregation function "sum( )" and the expression inside the aggregation function representing the measure 'revenue', are predefined in the data warehouse metadata.

In order to derive a structured query r∈R from a given question $q_u$, a series of problems may be solved. This forms a process 100 detailed in connection with FIG. 1c.

A first stage 102 comprises information extraction. Lower level semantics are derived from the user's question. Data and metadata of the underlying structured data source (i.e., domain terminology) is recognized (e.g., 'customers' refers to the dimension 'customer' in the data warehouse schema).

In this stage precision and recall of the recognition algorithms may influence the overall quality of the generated queries. Example technologies matching the question and domain terminology are discussed below.

To support more sophisticated queries (e.g., range queries or queries with orderings) and go beyond keyword-like questions, administrators may define custom vocabulary (such as 'middle-aged') and more complex linguistic patterns. An example of a more complex linguistic pattern is 'top 5'.

Such artifacts may export variables, such as the beginning and end of the age range in the case of 'middle-aged', or the number of objects to be shown to the user in the case of 'top 5'. A solution for defining linguistic patterns is also discussed further below.

In some cases it is difficult to map the users' input directly to a structured query. For instance dates or numbers may be expressed in different forms (e.g., '15000' as '15,000', '15 k' or even 'fifteen thousand'). This is also true for custom vocabulary such as 'middle-aged', which translates to a range on the 'age' attribute of the dimension 'customer' (see FIG. 2).

Therefore a normalization and transformation stage 104 employs a configurable mechanism to translate input variables derived from linguistic patterns, into variables conforming to the query language L. Similarly, a mechanism may be used to define variables for custom vocabulary (e.g., 'middle-aged' defines a range starting at '20' and ending at '30'). Details on configuring normalization and transformation functions are also discussed below.

A next stage 106 addresses structural constraints and missing artifacts. One challenge is to generate "valid" structured queries. Here, the term "valid" is used in the sense that $q_u \in L$ holds, and that $q_u$ returns a (possibly empty) result.

In an example from the BI-domain, a series of constraints may be considered in order to generate valid multi-dimensional queries in a next processing step. One possible constraint is that artifacts used within one query occur in the same data warehouse and data mart (if several are used). Another constraint is that a query comprises at least one measure or dimension.

Yet another possible constraint is that a query comprising two dimensions, requires one or more measures connecting those dimensions (see FIG. 2). This implies that these dimensions relate to the same fact table.

Still another constraint is that different interpretations for ambiguously recognized dimensions (i.e. different matches covering the same text fragment in the users' question) shall not be used within the same structured query. This is because allowing such different interpretations could change the aggregation level and lead to unexpected results. Using ambiguously recognized measures or filter terms for the same dimension may not be an issue, because they do not change the overall semantics.

Yet a further constraint may be that a sorting or truncation criteria (e.g., 'top 5') requires an assigned measure or a dimension. Several sortings and truncations can be applied within one query (e.g., for a question like 'Revenue for the top 5 cities with respect to number of guests and the top 10 resorts with respect to days'). If no dimension or measure for a sorting or truncation criteria can be extracted from the question, the system proposes at least one measure. In FIG. 1b, 'revenue' is proposed for missing input '?1' in FIG. 1a.

The examples above are an excerpt of the constraints that occur in the domain of BI. Other constraints might be imposed by the specific application and consideration with respect to the users' expectation.

Embodiments may provide visualizations to the user's business. Thus, a user who types 'revenue' as question is not necessarily interested in the total revenue achieved by the company since its existence (which a query comprising only of the measure would return). Most likely, a user is interested in a specific aspect such as the 'revenue per year' or 'revenue per resort', even though the user is not yet sure, which of these aspects the user would like to explore.

Accordingly in such situations embodiments may propose dimensions, that taken with the measures of the user's question, form a valid structured query. Embodiments may return a couple of suggested queries (represented as chart to the user), together with the total value.

The same may hold true if the user does not mention a measure, but only a dimension (as shown in the example in FIG. 1a.). In this case, the system proposes related measures (here 'revenue').

A related aspect is contextualization. A user might have a user profile, which augments the systems metadata (e.g., with the city the user is located in). In order to simplify the data exploration and return more relevant data for his current task, the user profile may be leveraged to impose additional filters.

Thus in FIG. 1a, the user asks for 'my city'. Knowing that there is a mapping between 'Palo Alto' in the user profile and a value inside the data underlying the dimension 'City', embodiments may automatically generate a structured query with a filter for 'Palo Alto'.

Considering structural constraints and possibilities to augment queries with artifacts from the underlying metadata (i.e. to propose queries to guide the user more efficiently), such constraints may be difficult to express and maintain in an imperative programming language. Accordingly, described further below is a declarative way to capture such domain or application-specific constraints to generate structured queries.

A next stage 108 involves mapping artifacts into structured queries. Once the constraints and artifacts to be considered are defined (such as dimensions, measures, attributes and custom variables—e.g., for 'top 5' or 'middle-aged'), they are mapped into semantic units (e.g., 'basic query' or 'range filter' as shown in FIG. 1a).

A new data structure that represents a query is created, such that artifacts referenced in the constraints are mapped to the respective parts of a structured query. These may be projections (i.e. measures and dimensions), selections (i.e. filters), and result modifiers (such as ordering or truncation expressions). Again, different query languages, domains, and applications may impose different requirements.

Measures and dimensions recognized as 'basic query' in FIG. 1a, are included in the projections. 'Age' as a dimension referenced by the range filter derived from 'middle-aged', shall not be included in the projections. This is because it would change the semantic of the query if included in the GROUP BY-statement in the listing of FIG. 1b.

In general, whether a dimension used within a filter expression shall be mapped to a projection, is application-specific. For instance in some cases there might be a direct mapping from the query result to a chart. Since most traditional chart types (e.g., bar charts) support only two dimensions, the number of projections could be reduced to a minimum and therefore complex queries could be split into several ones, each showing different views of the data set of interest.

Another way of reducing the number of projections could be to neglect projections for filters having only one value (e.g., as shown for 'Palo Alto' in FIG. 1b). This does not change the semantics of the query.

In a next stage 110, queries may be scored. As the previous step potentially generates several structured queries, queries can be ranked by relevance with respect to the user's question. A series of heuristics for ranking generated queries, is discussed further below.

In a next stage 112, ranked queries are executed. To improve query execution time, not only the execution of queries may be parallelized, but also the process of generating the queries.

Figure 8:
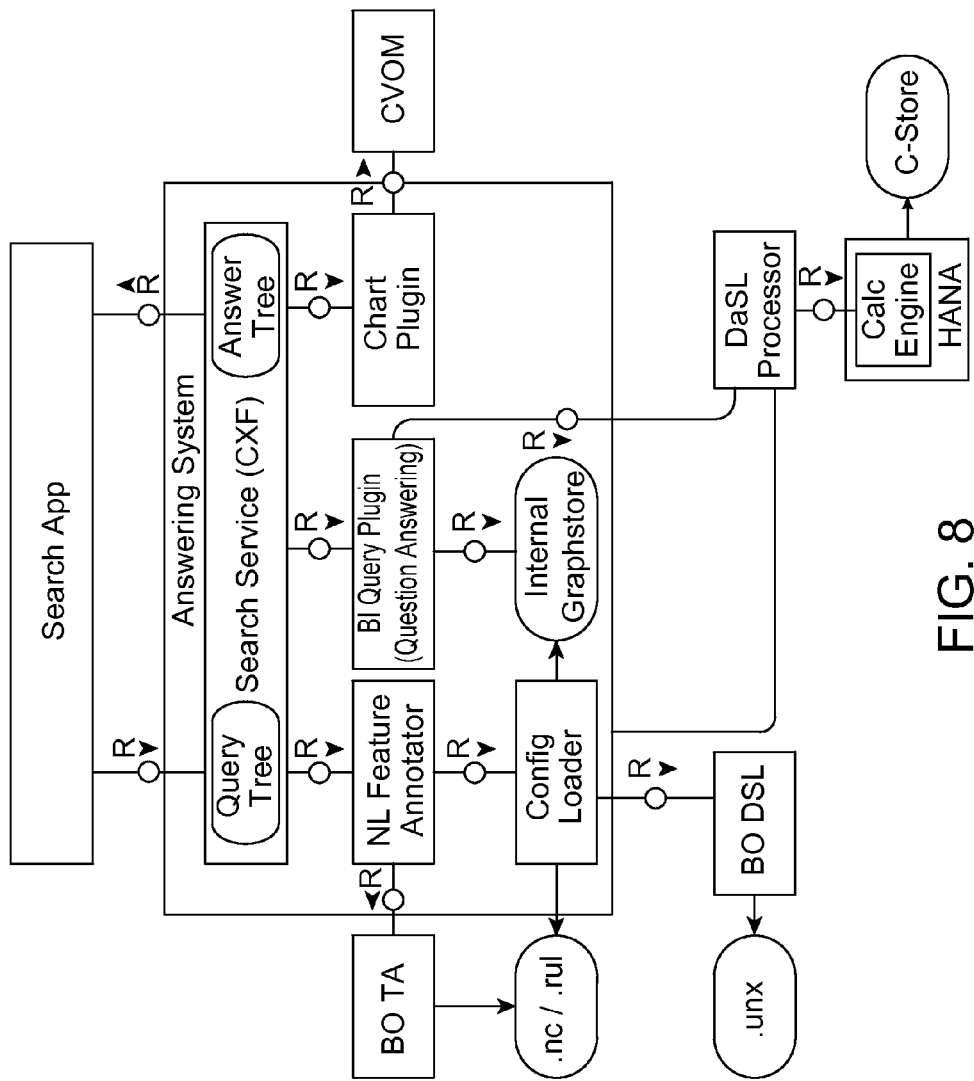
FIGS. 8-8e show various views of an architecture of a framework according to an embodiment.
Figure 8A:
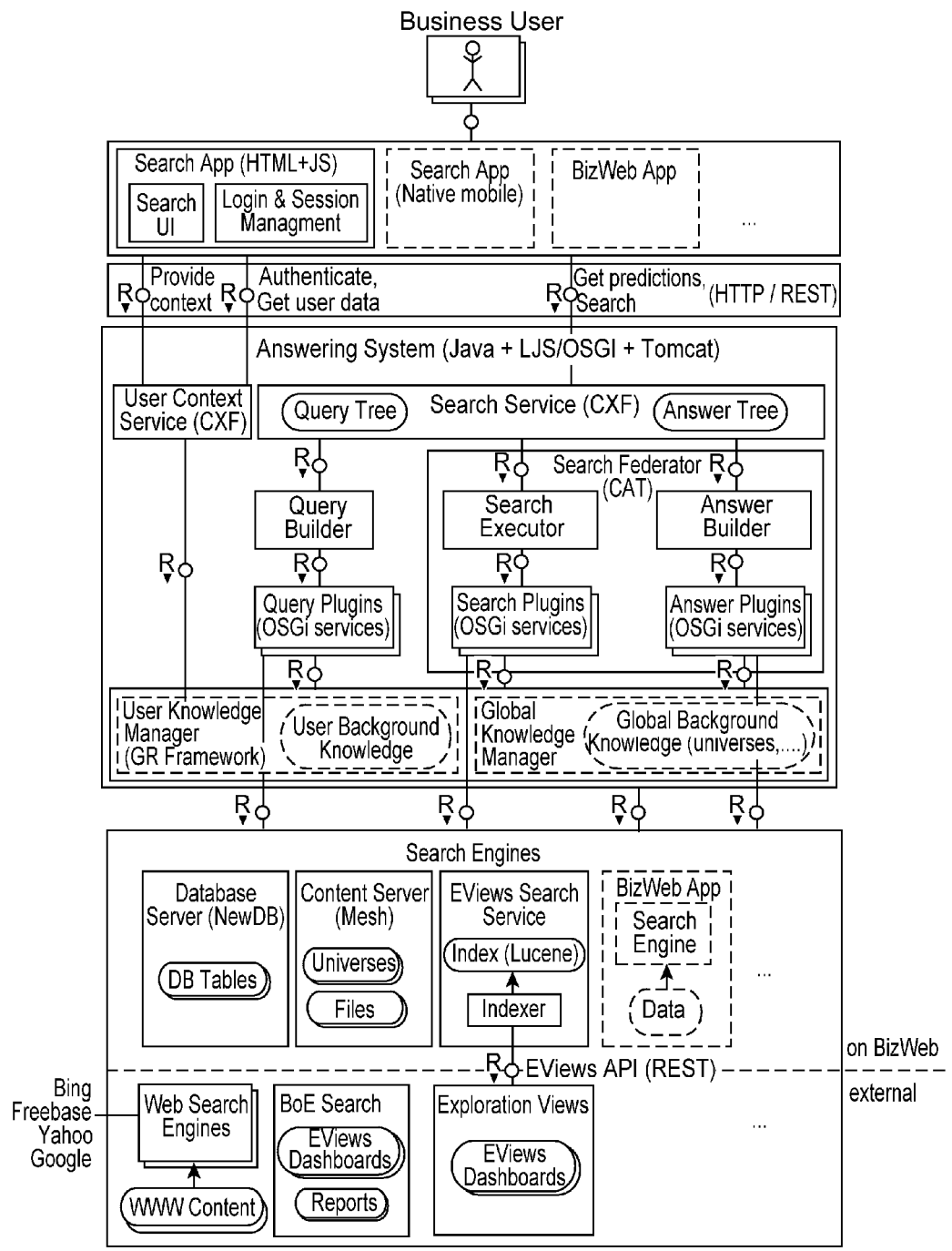
Figure 8B:
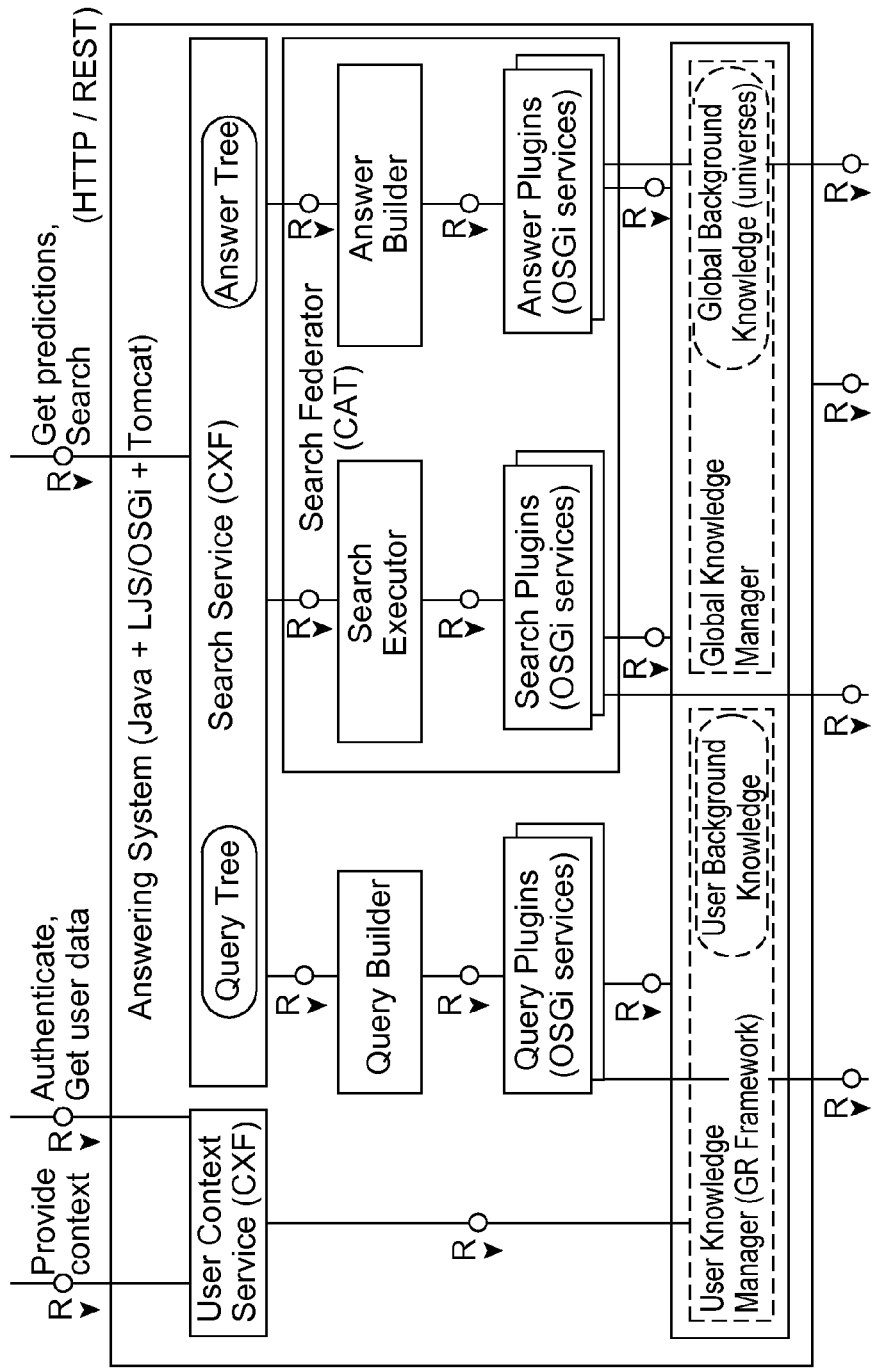
Figure 8C:
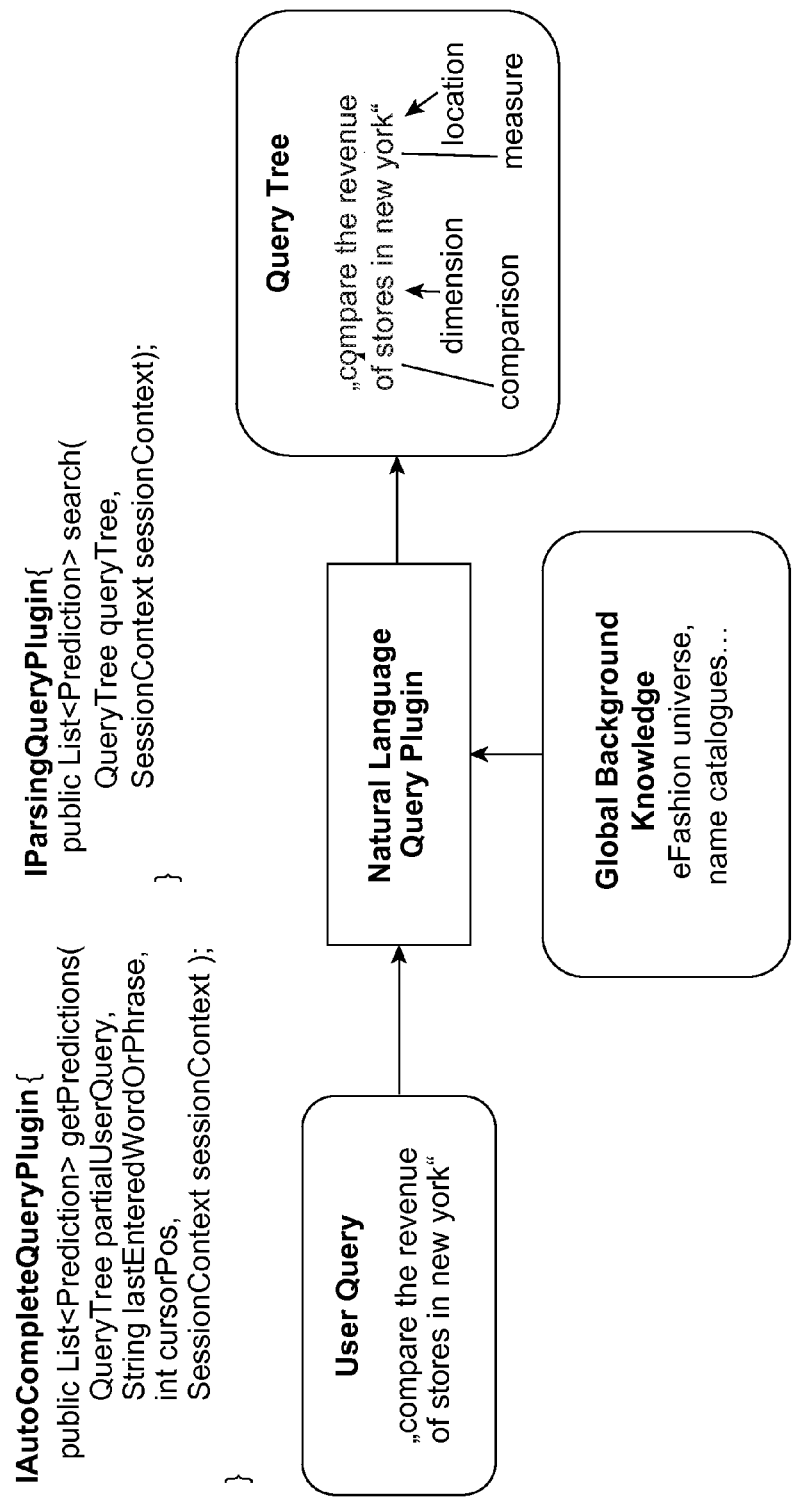
Figure 8D:
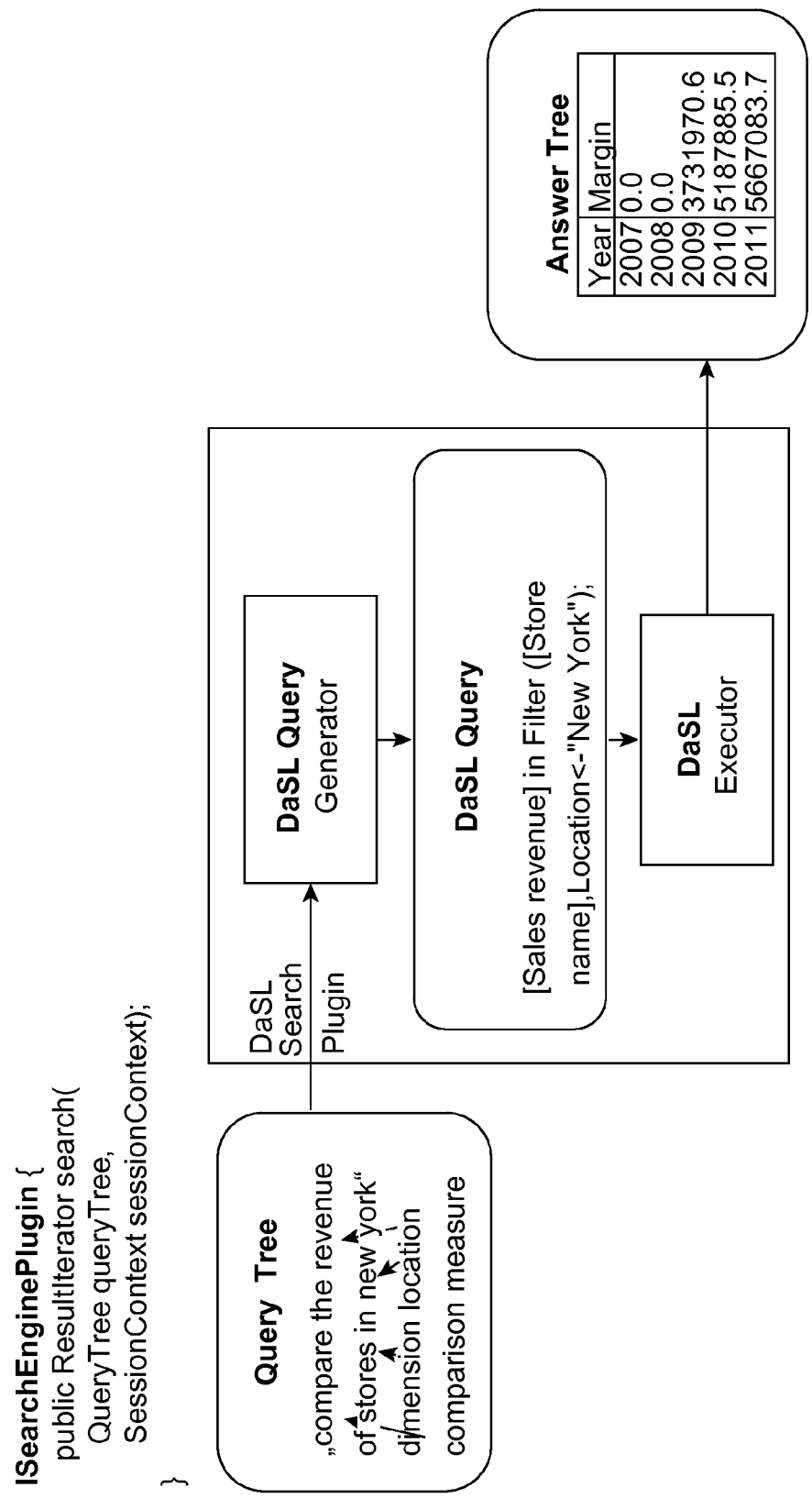
Figure 8E:
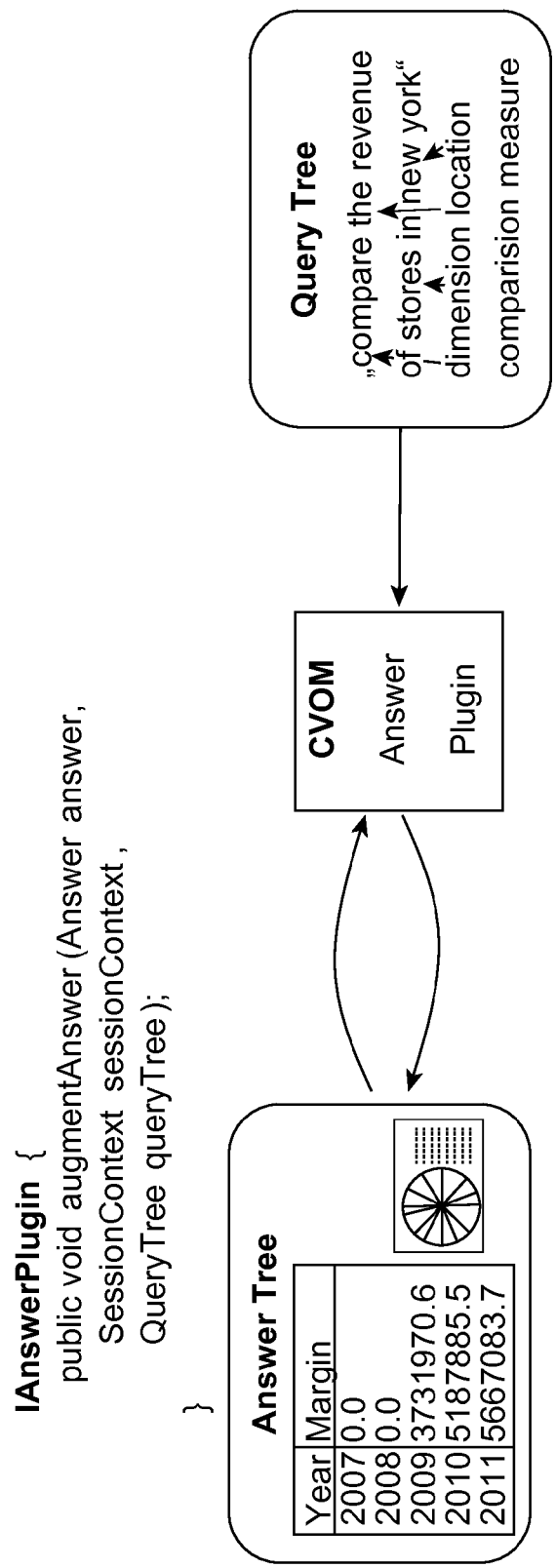

The overall architecture of a framework according to an embodiment is now discussed, in particular in connection with FIGS. 8-8e. Specific embodiments may employ a plugin-based processing pipeline, with an element including a framework for federated search.

On top are built abstractions for declarative question answering (Q&A). The system follows a plugin-based architecture.

At least three types of plugins are distinguished, each responsible for one processing step within the system. As discussed below, one plugin may extract information from the user's question. Another plugin may formulate and execute a structured query. Yet another plugin may post-process the result by rendering a chart.

Plugins within a certain processing step may be executed independently of each other. This potentially allows for a significant degree of parallelism.

An information extraction plugin of a first type analyzes the user's question by triggering information extraction components. These components contribute to a common data structure, the "parse graph" that is discussed in detail below. As used herein, the term query tree is synonymous with a parse graph. By default, the system may be equipped with multiple information extraction plugins instantiated for different data sources or configurations.

Examples of information extraction plugins can include but are not limited to:

plugins matching artifacts of the data source's metadata within the query plugins recognizing data values (directly executed inside the underlying database)

plugins applying natural language patterns (e.g., for range queries).

These plugins jointly capture lower-level semantic information to interpret a user's question in the context of the data warehouse metadata.

A search plugin of the second type operates on the common result of the information extraction plugins. This common result is the "parse graph".

The name "search plugin" reflects intent to execute some kind of query on some back-end system (which could be a traditional search engine in the scope of the federated search framework). A search plugin may use recognized semantics from the parse graph, and formulate arbitrary types of queries.

In the case of leveraging a traditional search engine, a plugin might take the users' question, and rewrite it using the recognized semantics to achieve higher recall or precision. For Q&A an abstract implementation of a plugin is defined that is equipped with algorithms to transform the semantics captured in the parse graph, into a structured query.

The output of a search plugin is a stream of objects representing a well-structured result together, with its metadata comprising the datasource that was used to retrieve the object and a score computed inside the plugin.

Post-processing plugins of the third type might be used for different purposes. They can alter the resulting objects in an arbitrary way (or even aggregate different results). One functionality of post-processing plugins may be to render appropriate chart types for a given result object.

FIGS. 8-8e show various views of an architecture of a framework according to an embodiment. In particular, FIG. 8 shows a general framework for question answering.

At least two implementations are available for the BI Query Plugin. One implementation utilizes plain Java, and does not access graphs. Another implementation is RDF and SparQL-based, a configuration that may offer certain benefits.

FIG. 8a shows a more detailed view of a framework according to an embodiment. FIG. 8b shows a detailed view of the answering system. Examples of a Query Plugin include but are not limited to Exploration Views (EViews) and Thing-Finder. Examples of Search Plugins include but are not limited to DaSL, HANA, Mesh, Exploration Views (EViews), Bing, Freebase, Yahoo, and Google. An example of an answer plugin may be based upon the CVOM library.

FIG. 8c shows a process example of query building. This implicates the Query Plugin and Global Background Knowledge to generate a parse graph (the Query Tree of FIG. 8c), as shown on the left side of FIG. 8b.

FIG. 8d shows a process example of search execution. This process flow utilizes a parse graph (the Query Tree of FIG. 8c) as input to the Search Plugin to generate the Answer Tree. For traditional search engines, the query string can be passed as is, or expanded and/or rewritten.

FIG. 8e shows a process example of answer building, implicating the Answer Tree and Answer Plugin found on the right hand side of FIG. 8b. An answer plugin could also aggregate results, for example from web searching.

One element of an overall system is metadata management and the runtime information captured in the parse graph. The term "parse graph" reflects a similarity to the term "parse tree" that is often used in the context of natural language processing.

The parse graph and other metadata for interpreting a question, may be captured in the form of RDF, since it is a widely-accepted standard for representing graphs. Certain embodiments may also benefit from leveraging off of the graph pattern query language SparQL. In the remaining description herein, the term "resource" refers to the actual RDF-representation, and the term "node" refers to higher level concepts (i.e. RDF resource plus some additional attributes if needed).

Figure 3:
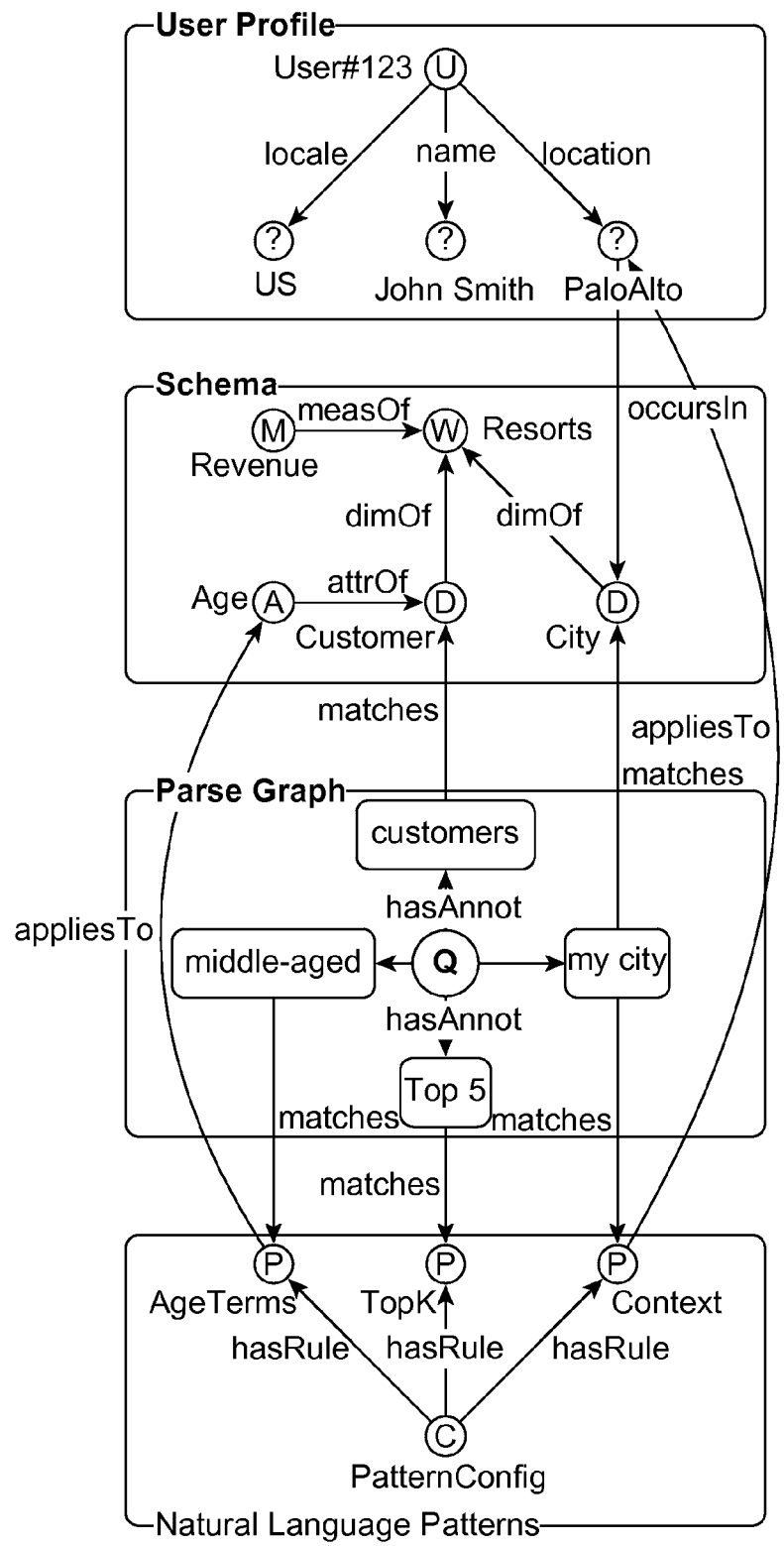
FIG. 3 shows an example of a parse graph for the example question from FIG. 1a, and other graph-organized metadata.

FIG. 3 shows an example of a parse graph for the example question from FIG. 1a, and other graph-organized metadata. The top of FIG. 3 shows a graph capturing the User Profile. Below is an excerpt of the graph representing the data warehouse's Schema.

Only one data warehouse (see 'Resorts' node) is shown in FIG. 3 for brevity. Only one measure ('Revenue'), two dimensions ('Customer' and 'City'), and one attribute ('Age') are shown.

In FIG. 3 the node 'City' is linked to the location node ('Palo Alto') from the user profile. This link may be automatically established by matching the values of the user profile against the warehouse's data.

On the bottom of FIG. 3 is shown a graph capturing metadata of some configured natural language patterns. This information may be kept inside RDF to relate these patterns to other resources.

For instance, the custom vocabulary for the vocabulary related to age (node labeled with 'AgeTerms') that is used to identify 'middle-aged', applies to the schema's attribute 'Age' by its pattern definition. The user context pattern ('Context'-node) relates to all user profile nodes that have a corresponding value in the warehouse's data (here: 'Palo Alto').

In addition, the nodes of the natural language pattern graph have properties like an executable information extraction rule, a set of variables that can be exported. For example, the 'TopK'-pattern exports the number of items that a user likes to see, and that the ordering is ascending (see FIG. 1a).

The Parse Graph itself is depicted in the third box from the top in FIG. 3. The parse graph is generated by information extraction plugins as previously described.

The parse graph comprises a central node representing the user's question (the larger node marked with 'Q'). The parse graph also comprises annotation nodes.

Annotation nodes are depicted with a rectangle shape in FIG. 3, labeled with the corresponding fragment of the users' question. Annotation nodes capture metadata that was acquired during the matching process (e.g., when matching data warehouse's schema or natural language patterns), and link to relevant resources used or identified during this process (e.g., a dimension or the natural language pattern that were used).

Kept as runtime metadata, for instance, may be:
the position of a match (offset and length of the matched fragment within the question);
the type of the occurred match (e.g., match in data warehouse metadata or match with natural language patterns), and a confidence value.

In addition, information extraction plugins may capture specific metadata such as instantiated output variables for natural language patterns (e.g., the '5' extracted from 'Top 5').

Derivation of a structure such as is shown in FIG. 3, and configuration of natural language patterns, is now discussed. Details regarding translating semantics captured during the information extraction process into structured queries, are later below.

To derive a graph structure such as shown in FIG. 3, the users' question is matched with the metadata and data of the underlying structured data source, and configured natural language patterns are applied. Matching algorithms are now discussed.

Matching the data sources' metadata may be accomplished using a federated search platform to implement a generic Q&A framework. An abstract information extraction plugin may be used for indexing RDF graphs and matching the user's question and the indexed data. It is used in the scenario presented to spot terms of the user profile and the data warehouse schema artifacts inside the users' question. One particular embodiment may use the standard information extraction system of SAP BusinessObjects Text Analysis™, but embodiments are this particular system.

The extraction system may be equipped with a custom scoring function for evaluating individual matches. In embodiments, this scoring function may combine TF-IDF like metrics, with Levenshtein distance, and punish in addition matches where the length of a term in the metadata is much longer than the string that occurs in the users' question. A threshold on the score may limit the number of matches that are considered for further processing.

If a substring of the users' question was identified as matching a term in the datasource's metadata (user profile or schema), the plugin generates an annotation node in the parse graph. This node links the matched node and the question node (see FIG. 3). As discussed before, runtime metadata such as the offset, length and score of the match may be stored as attributes of the annotation node.

Replicating a data warehouse or any other large data source to RDF may not be very efficient. Accordingly, embodiments may use custom plugins operating close to the data in order to match the question's content and warehouse data.

For a BI use case, the database mapping may be retrieved from the abstraction layer of the data warehouse (e.g., retrieving the table and column storing the customer age) and the calculation of matches may directly happen inside the database. In a particular embodiment where the data warehouse is SAP HANA™, this may be done using SQL-scripts. This functionality inside the database may leverage built-in full-text search capabilities.

For scoring, the raw TF-IDF values may be used, again with a threshold to reduce the number of matches. For each match the system creates an annotation node (similar to metadata as explained above), linking the question and the metadata node to signal the system that a value for a dimension was identified in the user's question.

A difference between metadata annotations mentioned in previous subsection, and the ones created for values, may be the annotation type which is assigned as a property to the annotation.

According to various embodiments, natural language patterns may be configured and executed as follows. A generic plugin for handling complex natural language features, can be used to implement custom functionality (e.g., range queries, top-k queries or custom vocabulary such as shown for "middle-aged" in FIG. 1a), in a manner exceeding keyword-matching.

Natural language patterns may be configured using RDF. Three parts of natural language patterns may comprise extraction rules, transformation scripts, and referenced resources.

Extraction rules are a basis for natural language patterns. Particular embodiments may use the CGUL rule language, which can be executed using SAP BusinessObjects Text Analysis™ or other information extraction mechanisms.

Particular embodiments may make use of built-in primitives for part-of-speech tagging, regular expressions, and the option to define and export variables (e.g., the '5' in 'top 5'). A rule might simply comprise a token or a phrase list (e.g., containing 'middle-aged').

Transformation scripts allow post-processing of exported variables once a rule fired (e.g., to transform '15,000' or '15 k' into '15000'), into an expression that can be used within a structured query. In some cases there may also be a need to compute additional variables.

A simple case for such functionality is to output beginning and end of the age range defined by a term such as 'middle-aged'. To do additional computations and transformations, scripts are embedded inside a natural language pattern, which can consume output variables of the extraction rule and can define new variables as needed.

Referenced resources may be understood as follows. Often, a rule is specific for a resource in some metadata graph. For instance in FIG. 3 the pattern for 'AgeTerms' applies only to the dimension 'Age', the 'Context' pattern applies only to nodes within the user profile, and other patterns apply only to certain data types (e.g., patterns for ranges to numerical dimension values)—which are also represented as nodes.

In order to restrict the domain of patterns, referenced resources may be specified. A discussion of how these references can be used in generating structured queries, is provided further below.

An example natural language pattern is shown in FIG. 3a. It depicts a pattern to compute from a phrase such as 'for the last 3 years', two date expressions (beginning and ending date) that can be used in a structured query.

The example pattern is presented in the Turtle RDF format. The first line defines the URI of the pattern (i.e. the subject of all following properties). Remaining lines define the pattern's properties in terms of predicates and objects.

Line 2 and 3 include the type and description in the sense of RDF and RDF-Schema. In line 4 the variables are defined that are output of the pattern, here ('yearsBack'), and the actual dates ('rangeBegin' and 'rangeEnd').

The extraction rule is defined in lines 5 and 6. It comprises some trigger words like 'last' or 'previous', the exported number ('[OD]' marks that the expression between shall be exported; '<POS:Num>' references the part-of-speech tag for numbers), and the ending token 'year' (and its stems).

Between line 7 and line 17 stands the script used to compute the actual values for the variables 'rangeBegin' and 'rangeEnd'. JavaScript may be used because it can be executed easily in other host programming language (e.g., Java) and be embedded into the RDF representation to store the rule definition and the transformation logic together. In the last line, this rule is defined as only applying to dimensions which have values of data type 'Date'.

Once an extraction rule fired and the attached script has been evaluated, an annotation node in the parse graph is created as shown in FIG. 3. The annotation node carries as properties, runtime metadata such as the match position (again offset and length inside the user's question), the annotation type, and the computed variables.

A variety of structural constraints may be present. Once the parse graph is created for a particular user question, the system may ensure domain- and application-specific constraints, before an actual structured query can be generated.

For a BI use case, some of the constraints have already been mentioned. Examples are to ensure that recognized entities belong to one data warehouse, and that a structured query should contain at least one measure and dimension.

Other constraints may apply on: how entities occur together in the query, the data types of the recognized entities, or to which other entities the recognized entities relate to. These also include suggested entities, in case the user did not include all necessary information to compute a valid query or to add additional filter for personalization.

In reality there may be many complex constraints to be ensured to compute valid structured queries. The issue to be addressed is how to encode such constraints on metadata level, without encoding them into the actual program logic. This can be difficult to manage. In addition, it may make sense to separate the constraint solving problem from the actual mapping and query generation process, in order to keep it manageable and ease the configuration.

Embodiments may express structural constraints in a SparQL WHERE clause to select and modify properties defined in the parse graph to be used in the technical query. Defining variables in this WHERE clause allows separation of the selection of items for reuse in the mapping step.

These variables are then mapped into the query model (representing the actual query language L) using a CONSTRUCT clause. That CONSTRUCT clause is described below.

A possible benefit according to certain embodiments is to allow description of certain situations that may evolve from the user's question, rather than having to program generation of alternative solutions.

Two types of constraints are now discussed. Relational constraints apply on the edges and nodes in the graph. They describe certain situations expected in the user's question (e.g., a dimension and a measure belonging to the same data warehouse), or implement the suggestion of additional artifacts to ensure the validity of the final query.

Property constraints can be used to filter nodes based on property values to determine certain situations that cannot be expressed on graph level. An example is whether two annotations are overlapping or close to each other.

Turning now to relational constraints, SparQL queries are essentially graph patterns (or more correctly: triple patterns). Nodes and edges can be addressed by URIs or can be assigned to variables if they are kind of placeholders. These variables are then bound to URIs or literals by the SparQL query processor. This mechanism of expressing graph constraints and of binding variables may ease the implementation and configuration.

Figure 4A:
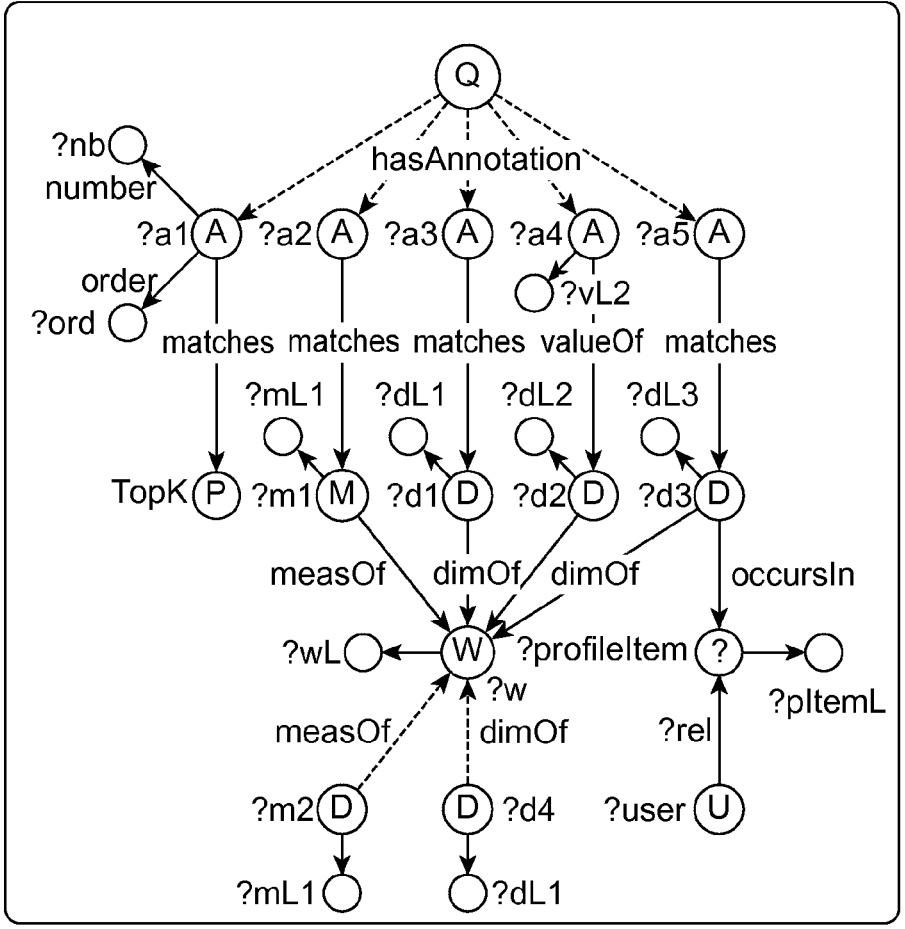
FIGS. 4aa-bb show a visualized example for selection and mapping rules used in an application setting

To demonstrate the power of a SparQL approach in expressing complex constraints, FIGS. 4aa-bb show a visualized example for selection and mapping rules that are used in an example application setting.

FIG. 4aa shows an excerpt of the constraints and defined variables used for a BI use case. FIG. 4ab shows a mapping defining constraints and variables. The markers attached to a node in FIG. 4aa represent in contrast to FIG. 3 assigned variables or URIs.

URIs are expressed in short form and do not carry a leading question mark. Edges between nodes and literals refer to rdfs:label if there are not marked otherwise. Dashed lines illustrate that a particular part of the graph pattern is optional (implemented through an OPTIONAL statement assigned to the corresponding block in SparQL).

The node representing the user's question is depicted on top (labeled with 'Q'). Below are the annotation nodes, and to the left of the annotation nodes are the assigned variable names (e.g., '?a1'), which form the parse graph.

Other nodes reference metadata graphs as shown in FIG. 3. Certain nodes in FIG. 4aa represent resources, while others represent literals which will be reused later for query composition.

Only literal variables may be mapped to the final query model, in order to separate the input and output model on conceptual level. More variables may be defined in the real-world use case (e.g. to handover data types and scores from the question to the query model), but these are omitted for the sake of brevity. Constraints are seen for the following situations.

Natural Language Patterns ('?a1')

The first annotation ('?a1') addresses the natural language pattern for TopK (see also FIG. 3). The TopK-pattern exports the variables 'number' and 'order', which are bound to '?nb' and '?ord'. This rule might be combined with a rule triggered by phrases like 'order by . . . ' in order to assign a variable holding the dimension or measure for that an ordering shall be applied. Here it is shown how to handle situations without such user input. In general, one can combine different natural language pattern easily by using property constraints as explained below.

Patterns for ranges, custom vocabulary, my-questions (e.g., 'revenue of my stores') and so on are treated in a similar fashion. In particular for ranges and other data-type related mapping situations, additional variables are defined for the data type of certain objects (e.g., 'Date' or 'Numeric'), to handle them separately in the final query construction. These attributes may also influence the final serialization of the final structured query (e.g. to encode filters on 'String'-data types with surrounding quotes.)

Data Warehouse Metadata ('?a2' and '?a3')

The second and third annotation ('?a2' and '?a3') refer to a recognized measure and dimension. That is, they are bound via a 'matches' relationship in FIG. 4aa and are triggered by questions like 'revenue per year'.

Only the assignment of one measure and dimension is shown here, while an arbitrary number of measures and two dimensions (due to the requirement of showing the results in a chart) are allowed in the example use case. By assigning the nodes for the measure ('?m1') and dimension ('?d1') to the same node for the data warehouse (i.e. '?w'), one can ensure that these objects are compatible (i.e. can be used together in a structured query) and therefore lead to a valid query.

Note that further checking may be performed whether recognized dimensions and measures are linked through a fact table (see FIG. 2). For reuse in the structured query, the labels of the recognized objects are assigned to variables (i.e. '?mL1' for the measure label, and '?dL1' for the dimension label).

There may also be cases where the user mentions only one of the object types (either measures or dimensions) to get an overview of his data warehouse from multiple views. In such cases the system suggests fitting counterparts (e.g., compatible dimensions for a measure) to not aggregate all facts for the mentioned measures or show all values of the mentioned dimensions, which would not be very useful in an example BI scenario.

In the example in FIG. 2 '?d4' is chosen as a dimension if the question contains only measures, and '?m2' as dimension if it contains only dimensions. Thus the system generates multiple interpretations for the user's question by proposing different views on the warehouse's data. SparQL blocks containing '?d4' and '?m2' are optional and contain a filter (i.e., a property constraint), such that they are only triggered if either '?mL1' or 'dL1' are not bound.

The label of the recommended measure or dimension is finally bound to the respective label variable that would otherwise be unbound (i.e. '?mL1' or 'dL1'). This is again an example on how easy it is to model different match situations with a declarative Q&A framework according to embodiments.

Data Warehouse Values ('?a4')

Matches for dimension values may be handled differently from matches on dimension names as shown for '?a4' in FIG. 4aa. Instead of the 'matches' relationship, the URI 'valueOf' is used to assign the dimension value to the corresponding dimension (i.e. '?d2'). For later re-use the value's label ('?vL2')—e.g. '2009' for a year—and the dimension name are assigned to a variable ('?dL2'). In addition, it is ensured that '?d2' is compatible with other data warehouse objects used in this interpretation/structured query (i.e. that there is a relation 'dimOf' starting at '?d2' and ending at '?w').

Only one match situation is shown in the example. However, the real-world use case also considers a couple of other situations where the declarative approach finds value. For instance, it is shown here only the case that the matched value does not belong to an already recognized dimension: i.e. 'd2' would be an additional dimension in the query.

For the situation that the value belongs to '?d1' (an already-recognized dimension), another optional SparQL block is defined that is triggered by the 'valueOf' relationship between the annotation and the corresponding dimension.

If there is more than one recognized value, they are assigned to the corresponding dimensions. This can be done with graph patterns. In addition, single value matches for one dimension may be treated differently, than matches on multiple values belonging to the same dimension (i.e. to define an additional projection). This would allow to reduce the number of projections as discussed above and is possible due to the declarative approach, because another set of constraints with separate variables are defined that are only used in the mapping step if such situations occurs.

Personalization ('?a5')

Annotation '?a5' shows a personalization feature, which applies a filter for a mentioned dimension if a corresponding value occurs in the user profile (see 'my city' in FIG. 1a). The constraint captures the following situation.

An annotation ('?a5') refers to a dimension ('?d3') that 'occursIn' some resource ('?profileItem'), that in turn has some relationship ('?rel') to the user ('?user'). From the defined graph pattern, considered for later processing is the label of the mentioned dimension ('?dL3') and the label of the user profile value that occurs in this dimension ('?pItemL').

The constraints for personalization as shown in FIG. 4aa do not refer to the my-pattern as shown in FIG. 3 for brevity. If the constraints were applied as shown here, every matched dimension would be tested for whether there is a value mapping to the user profile.

In summary, the examples above highlight the flexibility and convenience of using SparQL graph patterns to manage constraints and variables that shall be used for query composition in Q&A systems. In particular the assignment of suggested measures and dimensions for 'incomplete' user questions and ease in describing different match situations, demonstrate the power of this approach.

Graph patterns may not be enough. Additional constraints may be applied on a property or literal level as is now described.

Constraints (or more specifically, SparQL FILTER statements) may be considered in addition to graph patterns. They are less important on a conceptual level, but have many practical implications (e.g. to not generate duplicated queries, or to add further functionality, which cannot be expressed on graph pattern level).

A first additional constraint can be to check whether two annotations (that shall, for instance, match two distinct dimensions) are different, using for instance:
FILTER(!sameTerm(?a1, ?a2)).

It may be desirable to separate objects matching the same part of the users' question, into several structured queries. For example, if the user entered 'New York', one match could be derived on a value for the dimension 'state', and another match is derived for the dimension 'city'. This can be of particular importance for dimension names, because they define the aggregation level of the final result.

Such constraints could be expressed using the metadata acquired during the matching process. Assuming that the offset of one annotation (i.e. the position of a match inside the question) has been assigned to the variables ?o1, and the offset and length of another annotation are assigned to ?o2 and ?l2, the filter for ensuring that the latter one does not begin within the range of the first annotation can be expressed by:
FILTER(?o2<?o1||?o2>(?o1+?l2)))

Property constraints can be used for a number of more complicated query generation problems. Examples are range queries for arbitrary numeric dimension values. One can, for instance, define a generic natural language pattern for ranges which would look similar to the one shown in FIG. 1a (which would then apply to 'dataType:Numeric', be triggered by phrases like 'between ?x, and ?y', and include a script for normalizing numbers).

In combination with matched numeric dimension values, one can define a filter that tests whether two members where matched inside the matched range phrase, and generate variables defining the beginning and ending of a structured range query.

A convenient feature of SparQL 1.1 is to inject additional variables. (e.g., to define default values or generate additional values to be used in the structured query if a certain graph pattern occurs). Often, it may be useful to define default values or to bind additional variables for other purposes based on some constraints, which is possible using SparQL 1.1.

An example for a default value could be to limit the size of the query result to a certain value if it is not specified, using the following statement inside an optional SparQL block that checks whether the variable '?nb' was already bound beforehand:
LET(?nb:=1000)

Other use cases exist to inject additional variables. For instance one can define analysis types, which may be part of the not illustrated metadata assigned to a structured query. These may be used as indicators to select the best fitting chart type for a single result.

To capture such an analysis type, certain trigger words could be used, and additional constraints such as the number of measures and dimensions and the cardinality of dimensions may be leveraged. For instance a 'pie chart' could be selected if a single measure and dimensions are mentioned in the question, and the user is interested in a 'comparison' (e.g., triggered by the term 'compare' or 'versus'). If, however, the cardinality of the dimension (maintained in the metadata graph) would exceed a certain value (e.g., 10), a bar chart may be a better fit because a pie chart would be difficult to interpret.

Details of mapping variables to structured queries, are now described. It is noted that the actual target of this operation is to generate a well-defined model describing structured queries (not necessarily the query string that can be executed on the data warehouse).

For some cases (e.g. FIG. 1a) a structured query includes a data source (i.e. data warehouse), a set of dimensions and measures, a set of filters, and an optional set of result modifiers (e.g., ordering or truncation expressions). In more complex cases, the measure itself could be a computation based on other measures. However, for the example of FIG. 1a, a structured query could be represented as follows:

$$Q_1 = \begin{bmatrix} \text{data source} & = & \text{Resorts} \\ \text{dimensions} & = & \{\text{Customer}\} \\ \text{measures} & = & \{\text{Revenue}\} \\ \text{filters} & = & \begin{cases} \text{City} & = & \text{'Palo Alto'}, \\ \text{Age} & \geq & 20, \\ \text{Age} & \leq & 30 \end{cases} \\ \text{truncation} & = & \{(\text{Revenue}, \downarrow, 5)\} \end{bmatrix}$$

Curly brackets represent a set of objects, which might have a complex structure (e.g. for filters comprising a measure or dimension, an operator, and a value). Truncations may comprise a triple comprising the dimension or measure on which the ordering is applied, the ordering direction (ascending or descending), and the number of items.

Another interpretation for the user's question (since it does not contain a measure) would be the following, which is similar to the previous except for the proposed measure:

$$Q_2 = \begin{bmatrix} \ldots \\ \text{measures} & = & \{\text{Margin}\} \\ \ldots \\ \text{truncation} & = & \{\text{Margin}, \downarrow, 5)\} \end{bmatrix}$$

Since the representation shown above captures only a fraction of the potential queries, RDF is again used to capture the structure and semantics of the structured query. The structured query is then serialized to an executable query in a subsequent step.

As discussed above, FIG. 4aa shows how to derive potential interpretations (i.e. variables and the constraints between them) using a SparQL WHERE clause. FIGS. 4ba-bb show how to define the basic structure of a query (in RDF), and how to map variables into this model using a SparQL CONSTRUCT clause. This allows separation of pattern matching (which can be quite complex), from the actual mapping problem (which can be complex as well), ensuring fine-grained, flexible control over how to generate structured queries.

Rather than mapping resource variables (such as a dimension), only literal variables may be mapped into the query model to ensure reusability of the query model for other domains or use cases. The query model is therefore defined by its own RDF schema.

The schema of the query model is complex. Certain concepts are shown in FIGS. 4ba-bb.

Specifically, on the top of FIG. 4ba is seen the root node B defining a structured query. Below shown with dashed lines in FIG. 4ba, are the parts defined to be optional. These parts of the CONSTRUCT clause are only triggered if the respective variables are in the result of the WHERE clause, making it easy to describe alternative mappings for different situations as described in the parse graph.

Shown next to the actual query semantics in FIG. 4ba are some metadata nodes to the query node, such as the data source 'DS'. It is in turn bound to the variable '?w' representing the actual data warehouse upon which the generated query shall be executed.

Other concepts shown in FIG. 4ba include projection items ('PI') capturing projections that are part of the final structured query. Filter items ('FI') express selections on a certain measure or dimension. 'TO' expresses a concept capturing truncation and ordering clauses.

Projections ('PI') comprise an important part of the actual query. In the instant use case, projections comprise at least one measure and dimension. However, an arbitrary number of measures and up to two dimensions may be supported in the underlying example use case (defined as optional in the WHERE clause). The limitations to two dimensions is due to the requirement to generate meaningful 2D charts.

Different kinds of expressions may be defined via a common ancestor RDF type. Depicted here, the subclasses measure expression ('ME') and dimensions expression ('DE'). These nodes capture common metadata (not shown here) such as navigation paths (e.g., for drill-down operations) or confidence scores. In addition to the actual object that defines the projection, these nodes may refer to the measure reference ('MR') and dimension reference ('DR'). These references may capture the labels of recognized dimensions and measures as depicted in FIG. 4a ('?mL1' and '?dL1').

Again, it does not matter whether the recognized dimensions and measures (derived from 'm1' or 'd1') or the suggested ones (derived from 'm2' or 'd4') are used in the final query. This is because it is defined in the WHERE clause that suggestions are only made if no corresponding user input is available.

More complex artifacts may be included as subnodes of the expression ancestor node to support for instance, computed measures. An example for ad-hoc computations might be queries derived from questions containing 'relative margin' or 'margin divided by revenue'.

Truncation and Ordering ('TO') is one of the first nodes shown in FIG. 4ba. It represents ORDER BY and LIMIT clauses of a structured query or of a certain sub-select within such a query. Thus, several 'TO'—nodes can occur as sub-node of a query node.

If the variable '?nb' is not bound by the 'TopK'—pattern, the default value will be used and a single LIMIT will be generated. The 'Sorting Expression' ('SE') representing an ORDER BY is not to be generated in that case because the variable '?ord' is unbound.

If the user entered a question containing 'Top . . . ', both variables '?nb' and '?ord' are bound and we have to suggest an artifact to apply the ordering (unless the user entered 'order by . . . ', which is parsed by a dedicated pattern). Since top k questions usually relate to a particular measure (even if the query would be 'top 5 cities'), the order to the recognized or suggested measure can be safely applied by simply relating the node for the 'Sorting Expression' ('SE') to the one for the measure ('MR'). Note that in any case (and also if the user mentioned several measures), possible interpretations with respect to the ORDER BY assignment will be generated.

Filter expressions ('FE') represent a set of members (i.e. dimension values) or numerical values (in the case of measures) that can be used to filter the actual result. From a data model perspective, filter expressions capture the metadata's object (either dimension or measure) on which the restriction is applied, and a set or range of values that defines the actual restriction. More complex filter expressions can be defined as well (e.g., containing a sub-query).

In this example, only examples for member sets ('MS') containing a single member (represented by a value reference 'VR') are shown. The first case shows the situation where a member was directly recognized in the users' question. The variable '?dL2' originating from the dimension '?d2' is directly assigned to the member set, and a node for the value reference ('VR') is generated with a property for the actual value (i.e. 'vL1').

Note that it is straight forward to assign multiple matched members, since references for not bound variables will not be generated. Also worthy of note is that the approach does not need to care whether the respective dimension will be considered in the projections, since this can be handled by constraints as defined in FIG. 4aa.

The second example shown here is the one for personalization (i.e. to handle for instance 'my city' and use a filter leveraging the user profile). It works similar as the one for matched members, except that the value reference ('VR') relates to the label of the object in the user profile that carries a similar value as one of the members of a certain dimension (e.g., 'Palo Alto' for the dimension 'city'). Again complex mappings (like the one for personalization) can be implemented.

Range queries are conceptually similar to those containing a member set, no matter whether they are applied on dimensions or measures. Differences are that a natural language pattern is used for detecting numeric or date range expressions in the user's question to define variables, and that there are two value references defining the upper and lower bound of the actual filter expression.

As result of the mapping step, a RDF graph is obtained containing potential interpretations (structured queries) of the user's question.

Since the query model as such reflects the features of the underlying query language L (e.g., projections and different types of selections), it is straight-forward to serialize this model to an actual string that can be executed on a data source. The constraints defined in previous sections ensure on one hand how to treat different match situations, and on the other hand ensure that the generated queries are valid (i.e., return a result). Possible benefits from this approach are that complex constraints can be defined in a declarative way, and that they are to some extend separated from the mapping problem, making the implementation easier in the presence of complex requirements.

What remains is to score the generated structured queries in order to provide a useful ranking of results to the user and to define to order in which the computed queries are finally executed. This can be done by a scoring step.

Specifically, the previous step potentially generates several structured queries. Those queries must eventually be ranked by relevance. To do so, particular embodiments may combine four scoring functions by a weighted average. These are for instance:

(1) a confidence measure based on text retrieval metrics;

(2) the complexity of the generated query structured (the higher the complexity, the more relevant);

(3) a measure that determines the selectivity (i.e. the number of queries that were generated by a certain sub-graph of the constraint definition—the less results are generated from a sub-graph the more relevant could be a query); and (4) the popularity of entities (e.g., dimensions and measures) used to form the query.

Regarding (1), each entity match (e.g., on dimensions or measures) cares a confidence value c assigned by the named entity recognizer. These scores are aggregated for a particular generated query. In a particular embodiment, the confidence measure may comprise a variant of the Levenshtein distance.

Let $r=[m_1, \ldots, m_k]$ be the query r decomposed in its k matching entities or patterns, $c_1, \ldots, c_k$ the assigned confidence values and $\theta_t$ a weight that is configured for a particular match type t (e.g., on dimension, measure or natural language pattern). Then the confidence s1(r) of a resulting query r can be formulated as:

$$s_1(r) = \sum_{i=0}^{k} \frac{\theta_t c_{i,t}}{k}$$

Regarding (2), the complexity is a measure that bases on the number of objects identified in the question that could be used to formulate a particular query. Note that we may use here all objects (including suggested ones), while we might have considered for confidence only the ones that were matches in the question. Let $r=[m_1, \ldots, m_k]$ be again the query r decomposed in its k matching entities or patterns, T be the entity types (dimension, measure, filter, etc.) and $r'=(count_t(r))_{t \in T}$ be the vector representing the number of entities of type t in r. Then, the complexity of a result r is defined by:

$$s_2(r) = \frac{1}{|T|} \sum_{t \in T} \theta_t r'_{i,t}$$

Regarding (3), the selectivity may define how specific the a graph-pattern is with respect to the query The intention behind this measure is to boost very specific graph pattern matches, since they often cover special cases and are therefore usually more relevant if they occur. This "specificity" is computed as the inverse number of generated BI queries per graph pattern (i.e. sub-graphs of the WHERE clause). Let g be a the sub-graph in the WHERE clause that was used to compute a structured query r and R(g, q) the set of all queries that where computed from the question q, given the sub-graph g. Selectivity is given by $$s_3(r) = \begin{cases} \frac{1}{|R(g,q)|} & \text{if } \sigma \neq 0 \\ 0 & \text{otherwise} \end{cases}$$

Regarding (4), popularity may be computed from the query logs. When users open results, the popularity of entities (dimensions and measures) that are part of this result increases. The popularity of a search result r for user u is given by:

$$p_u(r) = \frac{t_{u,c}(r) - t_{u,o}(r)}{\max_r (t_{u,c}(r) - t_{u,o}(r))}$$

where $t_{u,c}(r)$ is the time when the result r was closed by user u, and $t_{u,o}(r)$ is the time when it was opened. This metric measures how long a search result has been seen by the user.

This metric should be used in conjunction with a threshold. For instance, a user might jump to another application once the desired result is obtained. As a result this metric would be extremely high, because user did not close the search result.

EXAMPLE

Evaluating retrieval systems may be difficult because each system meets a specific goal, and therefore classic evaluation metrics (such as precision and recall) might not be the best ones. Moreover, it is difficult to identify dataset or gold standard queries that can be used, apart from those from TREC evaluation (which may not be suitable for BI purposes).

An evaluation protocol dedicated to BI retrieval systems according to an embodiment, may be based on a popular dataset available to the public. ManyEyes is a collaborative platform where users publish datasets and corresponding visualizations (i.e. charts).

One of the most popular datasets comes from the American Census Bureau. These data are geographic, demographic, and social census data. The Census dataset has been integrated into a data warehouse, and the data schemas corresponding to these dataset created manually.

The evaluation corpus comprises the titles of the 50 best ranked visualizations (corresponding to the census dataset). This ensures that queries are not formulated by those who designed the data schema of the warehouse.

FIG. 10 presents some gold standard queries. In the comment column, "~" indicates how linguistic resources could improve coverage.

Performance has been measured in terms of execution time on the one hand, and IR metrics on the other hand. The processing time of the overall answering system has been measured.

Figure 5:
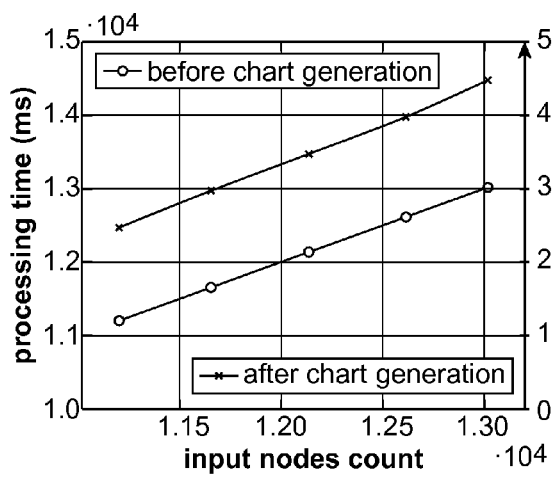
FIG. 5 shows processing time before and after the chart generation process as a function of the schema input nodes count.

FIG. 5 shows processing time before and after the chart generation process as a function of the schema input nodes count. FIG. 5 represents the processing time before rendering the charts (*), and after rendering the charts (x).

FIG. 5 shows that as expected, the processing time seems to be a proportion of the size of the graph used as input of the pattern matching algorithm. The part of the execution time dedicated to rendering the chart is approximately a third of the global execution time. This is due to the fact that datasets that are rendered as charts are voluminous.

For determining the performance we use the measure success at k that indicates at which position k the relevant result (i.e. chart) occurs in average within the list of results.

Figure 6:
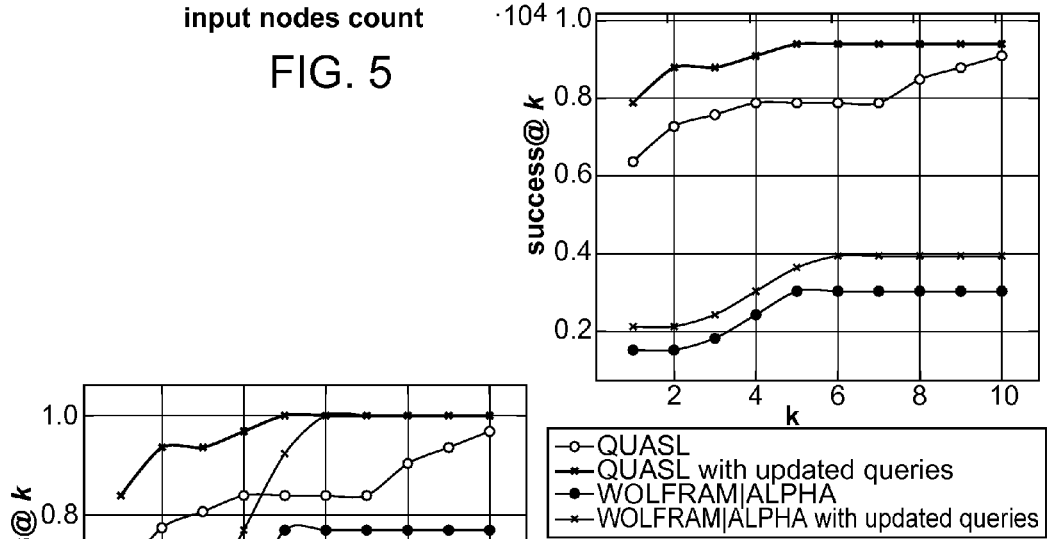
FIG. 6 plots success of answering gold standard queries, compared to Wolfram|Alpha

FIG. 6 plots the success at k for answering gold standard queries, compared to Wolfram|Alpha. Specifically, FIG. 6 compares the success for k varying from zero to ten for the answering system and Wolfram|Alpha.

Corrected success stands for results where the query has been modified in such a way that the system can better respond. For instance, it has been observed that Wolfram|Alpha provides better results if some queries are prefixed or suffixed with "US" or "Census" to explicit a restriction to a subset of available data ("US") or to the dataset itself ("Census").

Given the gold standard queries, the instant system embodiment answers better than Wolfram|Alpha. However, it is observed that one of the reasons for this performance is that Wolfram|Alpha does not include the entire Census dataset.

Therefore, a secondary success measure has been computed which takes into account if the dataset is known or not (i.e. if the system is able to answer the question). For Wolfram|Alpha, this has been determined by reformulating the questions several times until the expected result comes up. If not, we considered the dataset unknown by the system.

Figure 7:
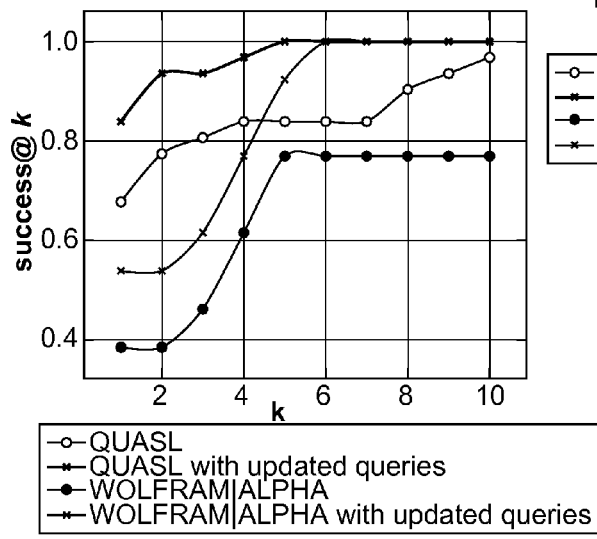
FIG. 7 shows variant of success of answering gold standard queries as compared to Wolfram|Alpha.

The results have been plotted in FIG. 7, which shows again the success at k for answering the remaining gold standard queries as compared to Wolfram|Alpha. In this FIG. 7, it is seen that Wolfram|Alpha performs better (under the assumption presented above) from k=4.

Experiment shows that a system embodiment behaves similarly as Wolfram|Alpha (a well-experienced system), demonstrating the system is well-configurable. And, as shown in FIG. 10, the embodiment could potentially be improved.

In particular, the second column ("updated query") of the table of FIG. 10, stands for the query modification required for the system to correctly interpret users' requests. The last column ("comment") provides some explanation on how the system could be easily improved in order to correctly interpret users' initial requests.

For instance the second query "Home ownership by State" fails, because the term "ownership" is unknown by the lexicon. However the term "dwellings" appears in some measures and is therefore part of the lexicon. Thus, basic linguistic resources (like WordNet) may be used to relate synonyms or terms with similar meanings.

The fifth query ("And the whitest name in America is") also requires little effort to be understood by the system. Indeed, the base form of the word "whitest" is "white", and is already part of the lexicon. Thus the query could be first normalized (operation for which many tools work well) and then processed, in parallel to the actual query.

The sixteenth query ("Where are rich people?") is a query that would require a little more effort in order to be correctly processed by an embodiment of a system. Indeed, the expressions "rich" and "household income" are not related because their words share a common root, but rather because they belong to the same lexical field. This means that the lexicon should not represent simply the terms (in addition to their base forms and variants), but also information about their meaning, and general ideas (e.g. in the form of concepts) that are provided by these terms.

The query "of Americans without health insurance" exhibits similarities. This is because the term "cover" belongs to the list of related terms for the expression "health insurance".

In conclusion, a Q&A framework according to embodiments answers questions in NL or keywords, and outputs results in a dashboard containing charts, tables, and the like. Experiments have shown that the system embodiments to be configurable and therefore useful in different settings.

Figure 9:
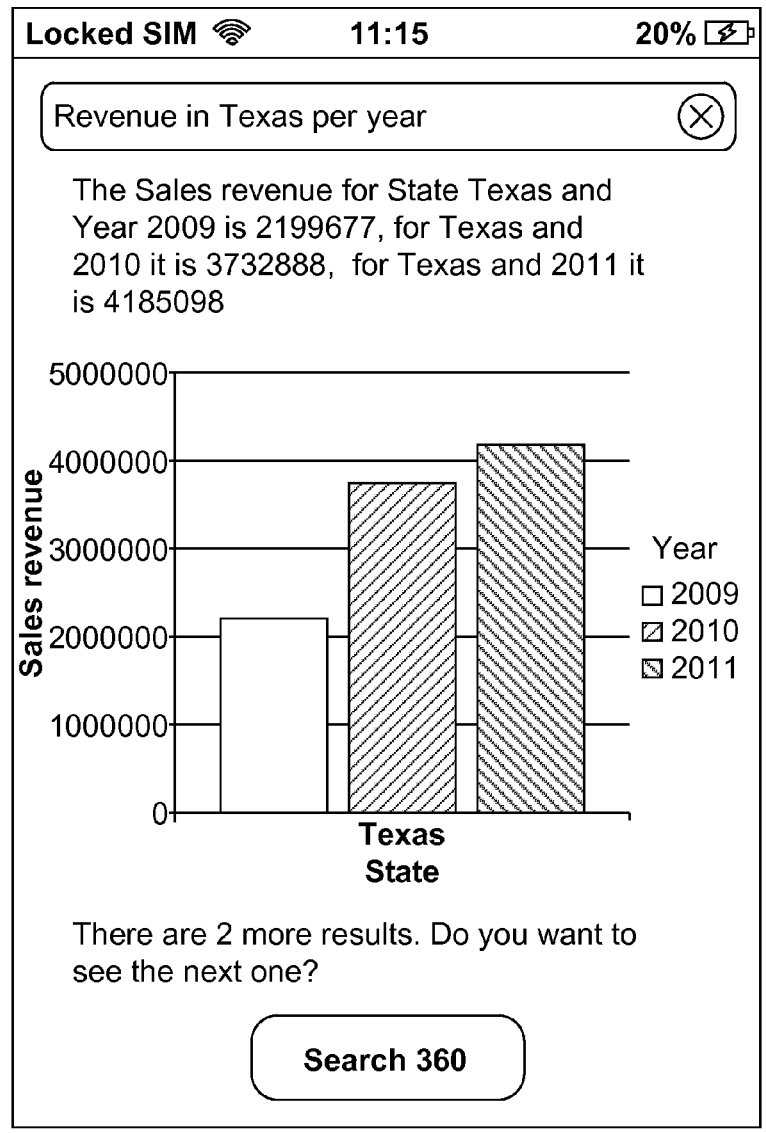
FIG. 9 shows an embodiment of a mobile interface operating based upon voice input.

The system may be comprised of both native mobile and Web search interface, and a backend system which retrieves and computes answers. FIG. 9 shows an embodiment of a mobile interface operating based upon voice input.

A component of the answering system translates NL inputs in database queries. To this end, a constraint-matching approach has been adopted, and this approach has been implemented using semantic technologies (say RDF triples).

In order to improve performance, the system has been implemented in a parallel manner.

At least two avenues are available to improve the system. First, machine learning approaches may be employed to better rank answers within a dashboard.

A second improvement may be available from making the system more automated. For instance, patterns are the core linguistic resources used to translate users' questions in database queries. These patterns could be automatically generated based on users' interactions and feedbacks, possibly through an authoring tool which would assist users in creating this resource.

Figure 11:
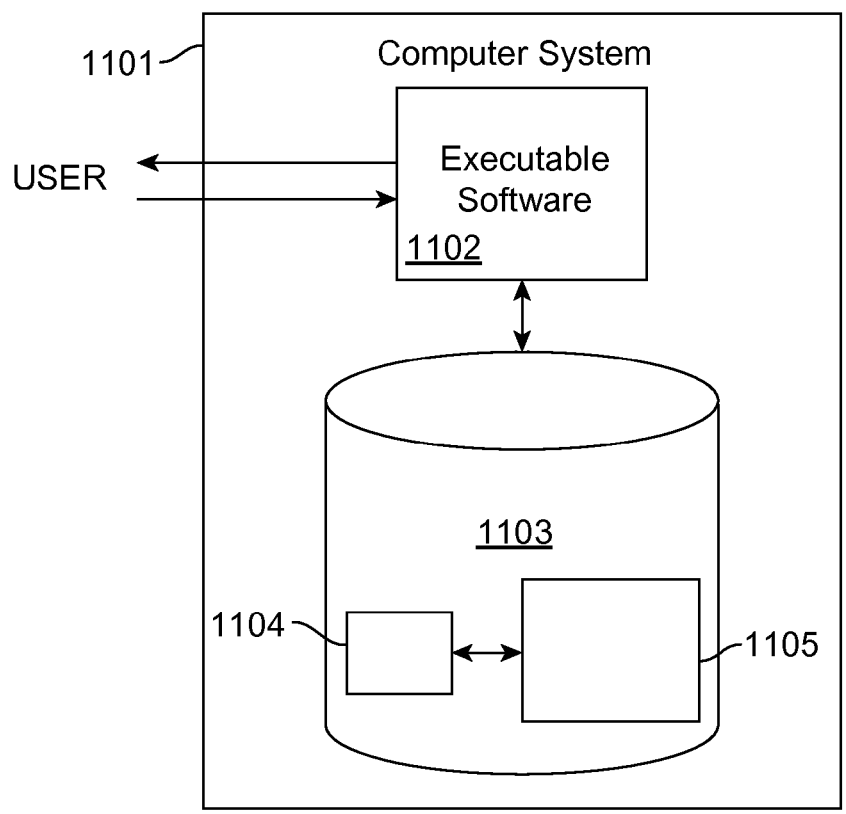
FIG. 11 illustrates hardware of a special purpose computing machine configured to perform Q&A according to an embodiment.

FIG. 11 illustrates hardware of a special purpose computing machine configured to perform question answering according to an embodiment. In particular, computer system 1100 comprises a processor 1102 that is in electronic communication with a non-transitory computer-readable storage medium 1103. This computer-readable storage medium has stored thereon code 1105 corresponding to a query plugin. Code 1104 corresponds to a search service. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
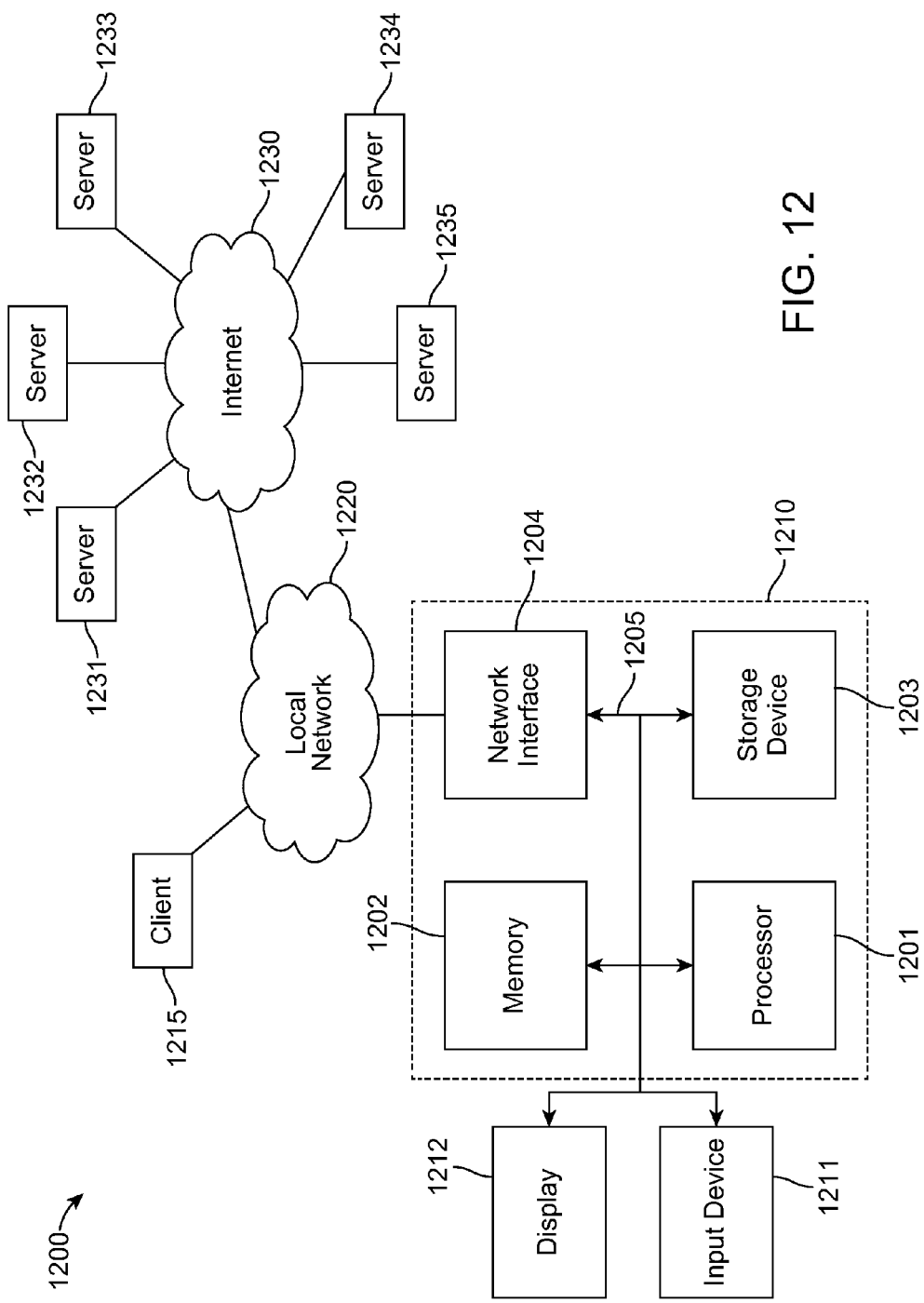
FIG. 12 illustrates an example of a computer system.

An example computer system 1210 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   causing an answering system to receive a user query posed in a natural language to a database;
   causing the answering system to derive semantics from the user query and create a parse graph, wherein the semantics comprise a first dimension and a second dimension;
   perform normalization and transformation of the semantics;
   imposing constraints on the semantics to create artifacts by proposing a related measure connecting the first dimension and the second dimension in a database table;
   mapping the artifacts into a plurality of structured queries;
   ranking the plurality of structured queries according to a first scoring function considering a selectivity of the related measure, and a second scoring function considering a complexity of the structured query such that a more complex query structure indicates a higher relevance, a third scoring function comprising a confidence measure based on text retrieval metrics, and a fourth scoring function comprising a popularity of the first dimension, the second dimension, and the related measure; and
   executing the plurality of structured queries on the database according to the ranking.

2. A method as in claim 1 wherein the answering system comprises an information extraction plugin configured to derive the semantics from the user query.

3. A method as in claim 1 wherein the answering system comprises a search plugin configured to:
   recognize certain semantics from the parse graph; and
   create the plurality of structured queries from the certain semantics.

4. A method as in claim 3 wherein the parse graph is captured in Resource Description Framework (RDF) form by the search plugin, and the plurality of structured queries are created in the SparQL query language.

5. A method as in claim 4 wherein the search plugin is written in Java.

6. A method as in claim 1 wherein the answering system further comprises a post processing plugin configured to render a chart for an executed query result.

7. A method as in claim 1 wherein each of the plurality of structured queries comprises a data source, a set of dimensions and measures, and a set of filters.

8. A non-transitory computer readable storage medium embodying a computer program for performing a method, said method comprising:
 causing an answering system to receive a user query posed in a natural language to a database;
 causing the answering system to derive semantics from the user query and create a parse graph, wherein the semantics comprise a first dimension and a second dimension;
 perform normalization and transformation of the semantics;
 imposing constraints on the semantics to create artifacts by proposing a related measure connecting the first dimension and the second dimension in a database table;
 mapping the artifacts into a plurality of structured queries;
 ranking the plurality of structured queries according to a first scoring function considering a selectivity of the related measure, a second scoring function considering a complexity of the structured query such that a more complex query structure indicates a higher relevance, a third scoring function comprising a confidence measure based on text retrieval metrics, and a fourth scoring function comprising a popularity of the first dimension, the second dimension, and the related measure; and
 executing the plurality of structured queries on the database according to the ranking.

9. A non-transitory computer readable storage medium as in claim 8 wherein the answering system comprises an information extraction plugin configured to derive the semantics from the user query.

10. A non-transitory computer readable storage medium as in claim 8 wherein the answering system comprises a search plugin configured to:
 recognize certain semantics from the parse graph; and
 create the plurality of structured queries from the certain semantics.

11. A non-transitory computer readable storage medium as in claim 10 wherein the parse graph is captured in Resource Description Framework (RDF) form by the search plugin, and the plurality of structured queries are created in the SparQL query language.

12. A non-transitory computer readable storage medium as in claim 11 wherein the search plugin is written in Java.

13. A non-transitory computer readable storage medium as in claim 8 wherein the answering system further comprises a post-processing plugin configured to render a chart for an executed query result.

14. A non-transitory computer readable storage medium as in claim 8 wherein each of the plurality of structured queries comprises a data source, a set of dimensions and measures, and a set of filters.

15. A computer system comprising:
 one or more processors;
 a software program, executable on said computer system, the software program configured to:
 cause an answering system to receive a user query posed in a natural language to a database;
 cause the answering system to derive semantics from the user query and create a parse graph, wherein the semantics comprise a first dimension and a second dimension;
 perform normalization and transformation of the semantics;
 impose constraints on the semantics to create artifacts by proposing a related measure connecting the first dimension and the second dimension in a database table;
 map the artifacts into a plurality of structured queries;
 rank the plurality of structured queries according to a first scoring function considering a selectivity of the related measure, a second scoring function considering a complexity of the structured query such that a more complex query structure indicates a higher relevance, a third scoring function comprising a confidence measure based on text retrieval metrics, and a fourth scoring function comprising a popularity of the first dimension, the second dimension, and the related measure; and
 execute the plurality of structured queries on the database according to the ranking.

16. A computer system as in claim 15 wherein the answering system comprises an information extraction plugin configured to derive the semantics from the user query.

17. A computer system as in claim 15 wherein the answering system comprises a search plugin configured to:
 recognize certain semantics from the parse graph; and
 create the plurality of structured queries from the certain semantics.

18. A computer system as in claim 17 wherein the parse graph is captured in Resource Description Framework (RDF) form by the search plugin, and the plurality of structured queries are created in the SparQL query language.

19. A computer system as in claim 18 wherein the search plugin is written in Java.

20. A computer system as in claim 15 wherein the answering system further comprises a post-processing plugin configured to render a chart for an executed query result.

* * * * *